US012754336B2

(12) United States Patent
Fuchey et al.

(10) Patent No.: US 12,754,336 B2
(45) Date of Patent: Oct. 6, 2026

(54) SYSTEM AND METHOD FOR NAVIGATING GEOLOGICAL VISUALIZATIONS

(71) Applicant: Schlumberger Technology Corporation, Sugar Land, TX (US)

(72) Inventors: Yannick Fuchey, Montpellier (FR); Mohammad Suliman Rahimi, Houston, TX (US); Agathe Ripoll, Le Chesnay-Rocquencourt (FR); Raphael Vonthron, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 466 days.

(21) Appl. No.: 18/260,505

(22) PCT Filed: Jan. 12, 2021

(86) PCT No.: PCT/US2021/013018
§ 371 (c)(1),
(2) Date: Jul. 6, 2023

(87) PCT Pub. No.: WO2022/150051
PCT Pub. Date: Jul. 14, 2022

(65) Prior Publication Data
US 2024/0053501 A1 Feb. 15, 2024

Related U.S. Application Data

(60) Provisional application No. 63/199,539, filed on Jan. 7, 2021.

(51) Int. Cl.
*G01V 1/34* (2006.01)
*E21B 43/00* (2006.01)
(Continued)

(52) U.S. Cl.
CPC .............. *G01V 1/345* (2013.01); *G01V 1/301* (2013.01)

(58) Field of Classification Search
CPC ........ G01V 1/345; G01V 1/301; G01V 20/00; G06N 3/0455; G06T 17/05; E21B 43/00
(Continued)

(56) References Cited

U.S. PATENT DOCUMENTS

2013/0144571 A1* 6/2013 Pepper .................. G01V 1/301 703/1
2013/0298065 A1* 11/2013 Kurtenbach ........... G01V 20/00 715/771
(Continued)

OTHER PUBLICATIONS

Liu, Y. et al., "Visual Analytics of Stratigraphic Correlation for Multi-Attribute Well-Logging Data Exploration," in IEEE Access, 2019, 7, 14 pages.
(Continued)

*Primary Examiner* — Michael P Nghiem
(74) *Attorney, Agent, or Firm* — Kyle R. Miiller

(57) ABSTRACT

A method, computing system, and computer-readable medium for navigating a geologic environment, in which the method includes obtaining first geological data representing a first location, correlating the first geological data with a chronostratigraphic timeline, receiving a selection of a second location, correlating second geological data representing the second location with the chronostratigraphic timeline, determining one or more characteristics of a geology of the second location based at least in part on the first geological data from the first location using the chronostratigraphic timeline, and visualizing a stratigraphic navigator representing the chronostratigraphic timeline and at least some of the second geological data for the second location.

15 Claims, 20 Drawing Sheets

(51) Int. Cl.
*G01V 1/30* (2006.01)
*G01V 20/00* (2024.01)
*G06N 3/0455* (2023.01)
*G06T 17/05* (2011.01)

(58) Field of Classification Search
USPC ............................................................ 702/16
See application file for complete search history.

(56) References Cited

U.S. PATENT DOCUMENTS

| | | | | |
|---|---|---|---|---|
| 2013/0321403 | A1* | 12/2013 | Piemonte | G01C 21/3638 345/419 |
| 2019/0034812 | A1* | 1/2019 | Borrel | G06N 20/00 |
| 2019/0213764 | A1 | 7/2019 | Vennelakanti | |
| 2020/0074027 | A1 | 3/2020 | Williams | |

OTHER PUBLICATIONS

Peters, S. E., et al., "Macrostrat: A platform for geological data integration and deep-time earth crust research", Geochemistry, Geophysics, 2018, Geosystems, 2018, 19, pp. 1393-1409.
"Interactive International Chronostratigraphic Chart" downloaded on Nov. 11, 2024 from <URL:https://web.archive.org/web/20201116211701/https://stratigraphy.org/timescale/>, 3 pages.
International Commission on Stratigraphy, downloaded from the internet on Nov. 18, 2024 at [(https://en.wikipedia.org/wiki/International_Commission_on_Stratigraphy)], Wikipedia, last updated May 6, 2024, 3 pages.

* cited by examiner

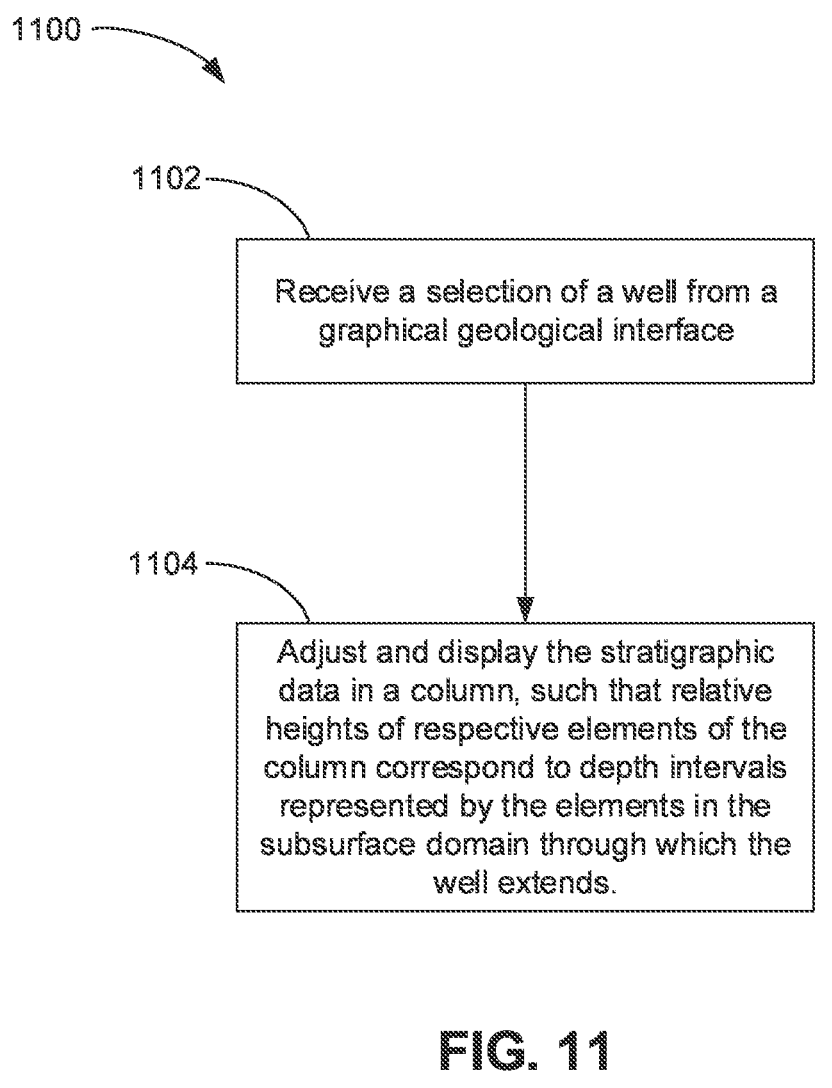

1100

1102

Receive a selection of a well from a graphical geological interface

1104

Adjust and display the stratigraphic data in a column, such that relative heights of respective elements of the column correspond to depth intervals represented by the elements in the subsurface domain through which the well extends.

FIG. 11

SYSTEM AND METHOD FOR NAVIGATING GEOLOGICAL VISUALIZATIONS

CROSS REFERENCE PARAGRAPH

This application is a National Stage Entry of International Patent Application No. PCT/US2021/013018, entitled "SYSTEM AND METHOD FOR NAVIGATING GEOLOGICAL VISUALIZATIONS," filed Jan. 12, 2021, which claims the benefit of U.S. Provisional Application No. 63/199,539, entitled "SYSTEM AND METHOD FOR NAVIGATING GEOLOGICAL VISUALIZATIONS," filed Jan. 7, 2021, the disclosure of which is hereby incorporated herein by reference.

BACKGROUND

Rock layers, rock types and rock ages are studied in different locations to understand the geology of the location. This branch of geology is referred to a stratigraphic characterization, as it seeks to determine attributes of the different layers or "strata" of the subsurface domain. The strata of different locations may undergo different processes, events, etc., and thus may be unique in some aspects between different regions; further, the strata of specific regions may be given region-specific names. Thus, depth-dependent data for the strata from one region may not carry over to similar depths or strata in other regions. As a result, it may be difficult to compare similar depths in different regions based on the local stratigraphic data.

Subdisciplines of stratigraphy include lithostratigraphy, which is based on local rock/formation names. Biostratigraphy is another subdiscipline and is based on fossil assemblage within the rocks for spatial and time positioning. Further, chronostratigraphy permits the correlation of strata in different regions based on a time standard. For example, the strata of different locations, which may be located at different depth intervals, have different names, etc., may thus be positioned on a chronostratigraphic timeline, which may permit comparisons of generally contemporaneously formed strata and inferences based on data from different locations.

The International Commission on Stratigraphy (ICS) maintains the International Chronostratigraphic Chart, which provides a reference timeline of the different chronostratigraphic ages of rocks. The ICS thus establishes a multidisciplinary standard and global geologic time scale that facilitates paleontological and geobiological comparisons region to region by benchmarks with stringent and rigorous strata criteria called Global Boundary Stratotype Section and Points (GSSPs) within the fossil record. The International Chronostratigraphic chart permits the geoscience community to use a globally agreed upon and recognized reference, describing the age and meta-type of stratigraphic layers, regardless of their presence in a specific region.

SUMMARY

Embodiments of the disclosure include a method for navigating a geologic environment. The method includes obtaining first geological data representing a first location, correlating the first geological data with a chronostratigraphic timeline, receiving a selection of a second location, correlating second geological data representing the second location with the chronostratigraphic timeline, determining one or more characteristics of a geology of the second location based at least in part on the first geological data from the first location using the chronostratigraphic timeline, and visualizing a stratigraphic navigator representing the chronostratigraphic timeline and at least some of the second geological data for the second location.

In an embodiment, the method includes receiving an input from a user via interaction with the stratigraphic navigator, and adjusting a display of the stratigraphic navigator based on the input from the user. Adjusting the display includes adjusting a granularity of the second geological data, the chronostratigraphic timeline, or both, or adjusting a portion of the second geological data that is visible by adjusting a selection of a portion of the chronostratigraphic timeline, or both.

In an embodiment, visualizing the stratigraphic navigator includes displaying the stratigraphic navigator in context with a graphical geoscience interface that displays geological data representing one or more wells.

In an embodiment, the method includes receiving a selection of one or more of the one or more wells in the graphical geoscience interface, and highlighting one or more portions of the second geological data in the stratigraphical navigator based on the selection.

In an embodiment, visualizing the stratigraphic navigator includes displaying the chronostratigraphic timeline as a chronostratigraphic column in the stratigraphic navigator. Elements of the chronostratigraphic column represent geological time intervals. In an embodiment, visualizing also includes displaying a stratigraphic column in the stratigraphic navigator based on the second geological data. The second geological data includes stratigraphic data, and the stratigraphic column includes elements representing one or more strata that are local to the second location. Visualizing may also include displaying a relationship between the elements of the stratigraphic column and the elements of the chronostratigraphic column.

In an embodiment, the method includes receiving a command to change a granularity of the stratigraphic column, and adjusting the granularity of the stratigraphic data such that more or fewer elements of the stratigraphic column are visible.

In an embodiment, the method includes receiving a command to change an age interval of the stratigraphic data that is being displayed in the stratigraphic column, and adjusting the age interval of the stratigraphic data that is being displayed.

In an embodiment, receiving a selection of one or more of the elements of the stratigraphic column, and highlighting one or more wells, one or more zones, one or more depth intervals of one or more wells, or both in a graphical geoscience interface based on the selection of the one or more elements. The one or more wells, one or more zones, or one or more depth intervals, or combination thereof extend through one or more strata represented by the selected one or more of the elements.

In an embodiment, the method includes receiving a selection of one or more wells, one or more zones, or one or more depth intervals of one or more wells in a graphical geological interval, and highlighting one or more strata of the stratigraphic data in the stratigraphic navigator based on the selection.

In an embodiment, the method includes receiving a selection of a well, and adjusting a height of at least some elements of the stratigraphic column such that a height of at least some of the elements represents a depth interval of the elements in a subterranean domain proximal to the well.

Embodiments of the disclosure also include a computing system including one or more processors, and a memory system including one or more non-transitory, computer-readable media storing instructions that, when executed by at least one of the one or more processors, cause the computing system to perform operations. The operations include obtaining first geological data representing a first location, correlating the first geological data with a chronostratigraphic timeline, receiving a selection of a second location, correlating second geological data representing the second location with the chronostratigraphic timeline, determining one or more characteristics of a geology of the second location based at least in part on the first geological data from the first location using the chronostratigraphic timeline, and visualizing a stratigraphic navigator representing the chronostratigraphic timeline and at least some of the second geological data for the second location.

Embodiments of the disclosure also include a non-transitory, computer-readable media storing instructions that, when executed by at least one processor of a computing system, cause the computing system to perform operations. The operations include obtaining first geological data representing a first location, correlating the first geological data with a chronostratigraphic timeline, receiving a selection of a second location, correlating second geological data representing the second location with the chronostratigraphic timeline, determining one or more characteristics of a geology of the second location based at least in part on the first geological data from the first location using the chronostratigraphic timeline, and visualizing a stratigraphic navigator representing the chronostratigraphic timeline and at least some of the second geological data for the second location.

Embodiments of the disclosure also include a computing system including means for obtaining first geological data representing a first location, means for correlating the first geological data with a chronostratigraphic timeline, means for receiving a selection of a second location, means for correlating second geological data representing the second location with the chronostratigraphic timeline, means for determining one or more characteristics of a geology of the second location based at least in part on the first geological data from the first location using the chronostratigraphic timeline, and means for visualizing a stratigraphic navigator representing the chronostratigraphic timeline and at least some of the second geological data for the second location.

Embodiments of the disclosure also include a computing system configured to obtain first geological data representing a first location, correlate the first geological data with a chronostratigraphic timeline, receive a selection of a second location, correlate second geological data representing the second location with the chronostratigraphic timeline, determine one or more characteristics of a geology of the second location based at least in part on the first geological data from the first location using the chronostratigraphic timeline, and visualize a stratigraphic navigator representing the chronostratigraphic timeline and at least some of the second geological data for the second location.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 11 illustrates a flowchart of another method for navigating a geological environment, specifically, interacting with a user via the stratigraphic navigator, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
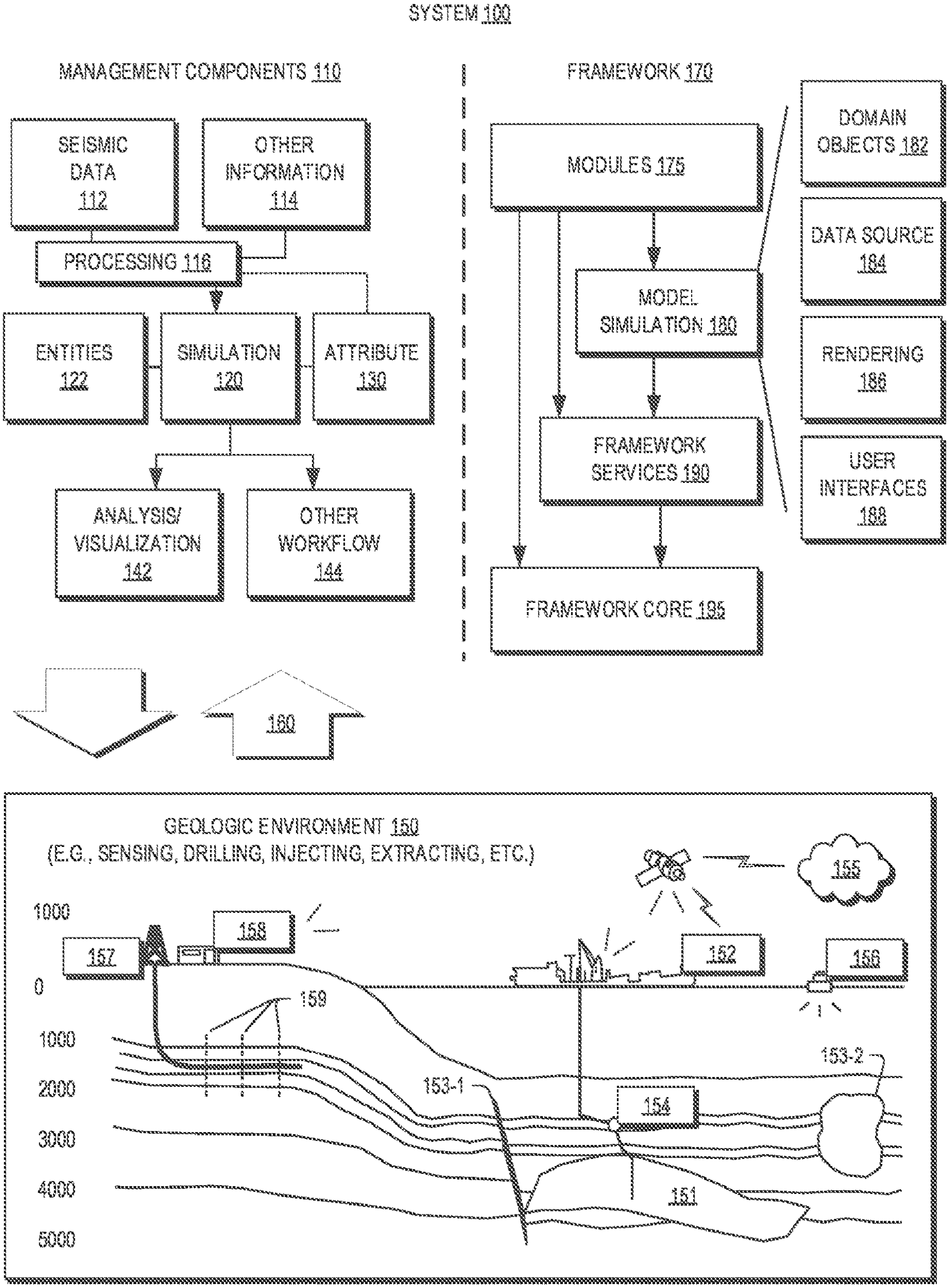
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NETS® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
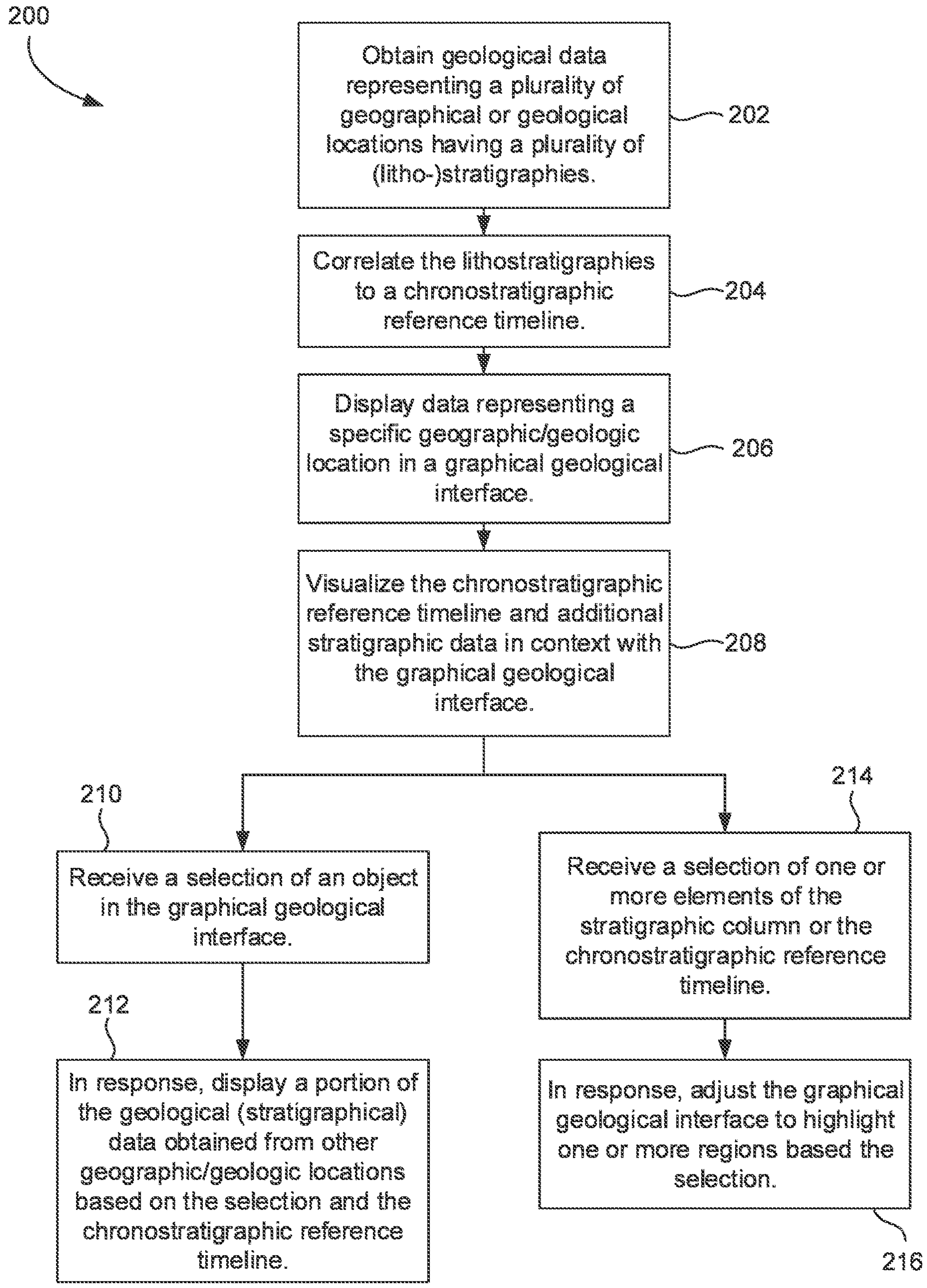
FIG. 2 illustrates a flowchart of a method for navigating a geological environment, according to an embodiment.

FIG. 2 illustrates a flowchart of a method 200 for navigating a geological environment (e.g., digital visualization), according to an embodiment. Various aspects of the method 200 may be conducted in the order described herein or in any other order; further, various aspects may also be combined, conducted in parallel, or condensed, without departing from the scope of the present disclosure.

The method 200 may include obtaining geological (e.g., stratigraphic) data representing a plurality of locations (e.g., geological and/or geographical locations) having a plurality of stratigraphies (e.g., lithostratigraphies), as at 202. Although reference is made herein to lithostratigraphic data, columns, etc., it will be appreciated that embodiments of the methods presented herein may operate using other types of stratigraphic data, consistent with the present disclosure. The stratigraphic data may be depth-dependent or at least depth-related. As discussed above, the strata at different geological locations (e.g., points or regions in different oilfields, basins, regions of the world, etc.) may differ from one another, such that, for example, the same strata may exist at different depth intervals (or not at all) in different locations, be referred to by different names, etc. Various applications may be employed to harvest this local data for storage in back-end databases, and the method 200 may make use of this data by obtaining it, e.g., from such databases at 202. In other embodiments, the method 200 may include collecting and storing the data.

In some embodiments, the method 200 may also include correlating the stratigraphic data to a chronostratigraphic reference timeline, as at 204. For example, the different strata may be categorized and labeled with appropriate chronostratigraphic labels or mnemonics based on age and thus may be arranged according to the (generally static) chronostratigraphic reference timeline. Accordingly, the relative age of the different rock layers may be stored, so as to allow comparisons of contemporaneous rock layers across different geographical locations. In some embodiments, such correlation may be done a priori, and the method 200 may access the correlated data.

The method 200 may include displaying data representing a specific (e.g., geographic or geologic) location in a graphical geoscience interface, as at 206. Using geographic locations as an example, various geological aspects of the geographic location may be displayed in the interface, for example, well logs, well tops, events, markers, etc. may be displayed. For example, a user may select a location, and, in response, the method 200 may display the data representing the specific location. The location selected may be one of the locations for which data was collected at 202. In some embodiments, a graphical geoscience application may be any application that ingests subsurface data and permits the user to visualize or manipulate the data. Such geoscience applications may also permit or otherwise facilitate processing of the data. Examples of such graphical geoscience interfaces may include mapping applications, data discovery applications, data conditioning applications, well interpretation applications, geological knowledge base applications, drilling applications, geothermal applications, or other applications that offer geoscience data visualization.

More particularly, mapping applications (e.g., PETREL®, TECHLOG®, AVOCET®, PETROMOD®, ECLIPSE®, RAPID SCREENING™, EXPLOREPLAN®, etc.) may generate a map of interest, such as a depth map, thickness map (between two layers or an addition of several layers of interest), or property map for a given stratigraphic interval (e.g., average gamma ray, water saturation, bulk density, VShale). Data discovery applications (e.g., DELFT® Gaia) may permit selection of a depth interval, which may act as a smart filter for the back-end search result and therefore for the related front-end display of the data, as will be described in greater detail below. Data conditioning applications may "clean" acquired logs (from tools), so as to remove environmental disturbances and various acquisition errors. Well interpretation applications may allow a user to access raw well logs and compute petrophysical or other sub-surface domain-oriented data. Geological knowledge base applications are those that collect geological knowledge about a given location, and provide users with a set of geological parameters (rock type, physical and chemical properties). This can include core information, for example. Drilling applications are applications that allow geoscientists or drilling engineers to view the subsurface, plan, monitor and pilot a drilling operation. Geothermal applications permit displaying subsurface data for geothermal solutions, such as drilling difficulty of litho-stratigraphies, thermal conductivity, water flow and piezometry, among others. Seismic interpretation applications are any application that permits working with seismic data.

The method 200 may also include visualizing the chronostratigraphic reference timeline and/or stratigraphic data known or identified gaps in data about the displayed location in context with the graphical geoscience interface, as at 208. This display may be provided by a "stratigraphic navigator". In some embodiments, the chronostratigraphic reference timeline may be visually depicted as one or more columns of elements, with individual elements representing individual time intervals (e.g., eons, epochs, etc.), according to an agreed-upon convention. The stratigraphic data may likewise be displayed as one or more columns, and relationships between the stratigraphic column and the chronostratigraphic column may be depicted.

For example, based on its position in the chronostratigraphic reference timeline, the stratigraphic data from a variety of different locations may be presented in context with the representation of the displayed location. This displayed location may or may not have different depth-based characteristics than the locations from which the stratigraphic data is collected. In some cases, the displayed location and other locations may not include the same label or mnemonic, despite referring to the same record of geological timeline. In some cases, the displayed location and other locations may refer to the same (litho-)stratigraphic reference but use mnemonic of two different hierarchical (granularity) levels. However, the chronostratigraphic reference timeline applies both to the subject location and the other locations, thus permitting the stratigraphic data from various locations to be used to assist in describing the stratigraphic makeup of the displayed location. Accordingly, data about one location may be displayed at least partially along with data collected from other locations, using the chronostratigraphic reference timeline to make connections between the stratigraphies of the different locations.

Further, the visualization provided at 208 may be adjustable, e.g., in time and resolution (or "granularity"). For example, the stratigraphic navigator may provide a time selector that permits scrolling through time in the chronostratigraphic reference timeline. Based on the position of the selector, stratigraphic data corresponding to the selected portion of the chronostratigraphic reference timeline may be depicted, e.g., in the stratigraphic column, while other portions of the stratigraphic column are not visible. Further, the granularity (e.g., resolution) of either or both of the chronostratigraphic column and/or the stratigraphic column may be adjustable so as to permit viewing and/or selection of narrower or wider time or depth intervals.

The stratigraphic navigator may also interact with a graphical geoscience interface, e.g., multiple different graphical geoscience interfaces of potentially different types, as noted above. For example, the method 200 may include receiving a selection of an object in the graphical geoscience interface, as at 210. Examples of objects may include one or more wells, zones, well tops or other well markers, well logs (or portions thereof), depth intervals, strata, horizons, faults, other geological features, or any other object that may be related to a geology of a location. The stratigraphic navigator may respond by "highlighting" (referring to anything that is configured to draw a user's attention to one element or group of elements over another, e.g., using size, color, font type and/or style (including bolding, underlining, etc.), obscuring or omitting non-highlighted material, etc.) one or more elements of the chronostratigraphic reference timeline and/or one or more elements of the stratigraphic column, as at 212. For example, a user may select a specific well, and the stratigraphic navigator may respond, according to an embodiment of the method 200, by highlighting elements of the stratigraphic data representing one or more strata through which the well extends. This stratigraphic data associated with the selected strata, may thus be rapidly apparent to the user, e.g., along with its relationship to its correlated chronostratigraphic reference timeline element(s).

The method 200 may also include receiving a selection of one or more elements in the stratigraphic navigator, as at 214. For example, one or more elements of the stratigraphic column and/or one or more elements of the chronostratigraphic reference timeline may be selected. In response, as at 216, the method 200 may adjust the graphical geoscience interface to highlight one or more regions in the view provided by the graphical geoscience interface. As noted above, the same stratigraphic navigator may persist in different geological interfaces (e.g., different software applications and/or platforms) and at different locations, thereby providing quick access to different stratigraphic information, e.g., events, etc. associated with a particular strata, as correlated by use of the chronostratigraphic reference timeline.

Figure 3:
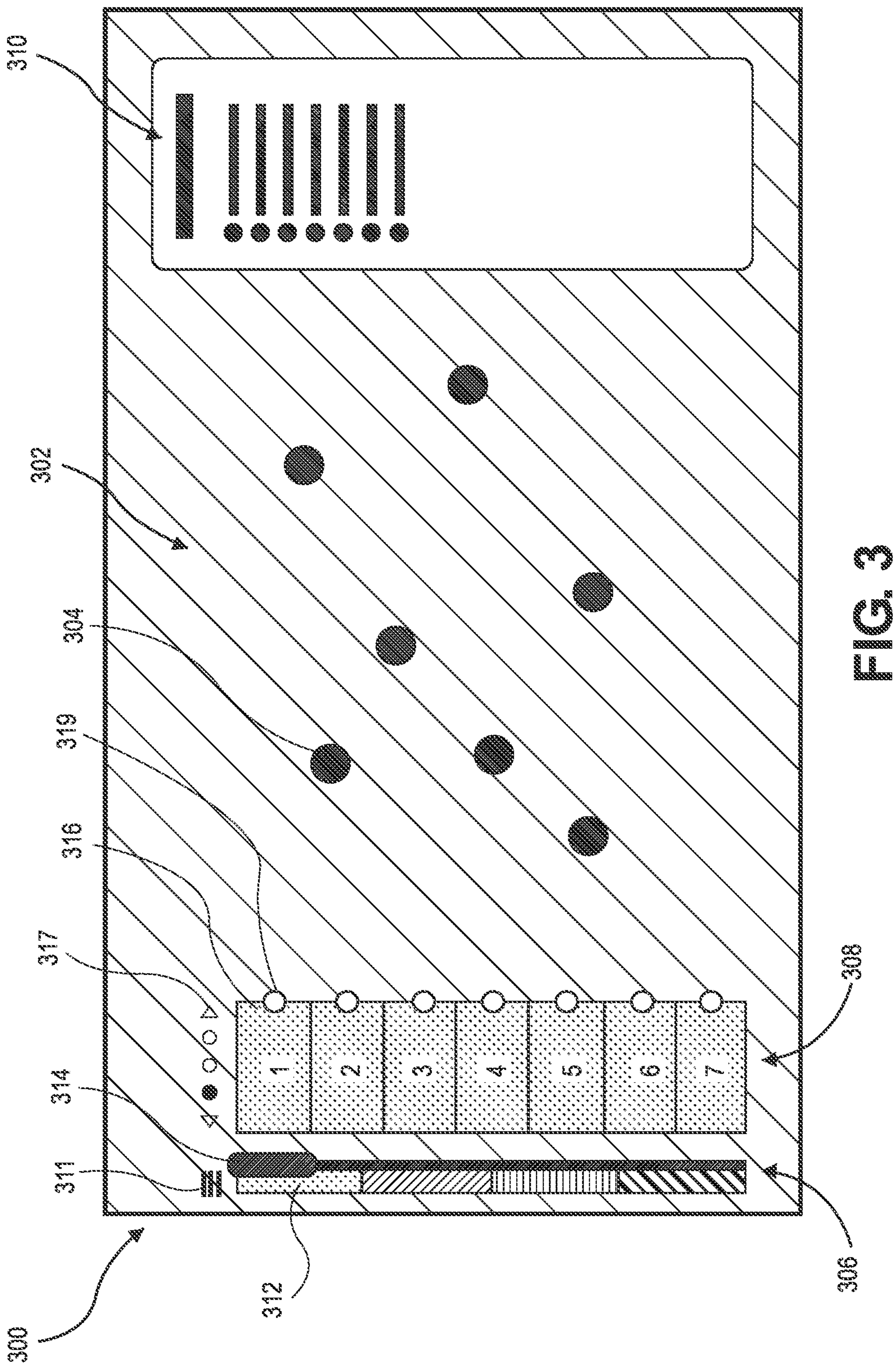
FIG. 3 illustrates a conceptual view of a stratigraphic navigator, according to an embodiment.

FIG. 3 illustrates an example of a stratigraphic navigator 300 displayed in context with a graphical geoscience interface 302, according to an embodiment. As shown, the interface 302 may include a graphical representation of objects, in this case, wells 304. The wells 304 are arranged as they may be seen geographically in a map of an oilfield. Instead of or in addition to wells, the objects could be any other type of geological object, e.g., basins, oilfields, etc., and the view might be a vertical slice or three-dimensional model, or any other view of data representing a subsurface domain.

The stratigraphic navigator 300, in this embodiment, may include a chronostratigraphic column 306, a stratigraphic column 308, and a list of wells 310. The chronostratigraphic column 306 may include elements (e.g., cells) 312 that represent the discrete time periods of the chronostratigraphic reference timeline. For example, the individual elements 312 may represent eonothems/eons, erathem/era, systems/periods, series/epochs, or stages/ages. The type of time interval represented may be adjustable by adjusting the granularity of the column 306, as will be described in greater detail below. By way of introduction, however, the granularity may be adjusted by combining or dividing the elements 312, such that one parent element 312 forms two or more child elements 312, or two or more child elements 312 are combined into one parent element 312, e.g., with the time interval of the parent element 312 encompassing the more specific time intervals of the child elements 312. In some cases, a child element 312 may have two or more parent elements, a parent may have no children, or there may be overlapping relationships between parent and children, meaning the beginning of the age of a child element 312 may be in the age interval of a parent element 312, while the end of the age of the child element 312 is in the age interval of a subsequent parent element 312, etc. Thus, the parent-child relationship may not be straightforward, but may still be represented in the navigator 300. This division or combination of elements 312 may be visualized in many different ways, e.g., by sweeping in a new column 306 populated with larger or smaller elements in a lateral direction.

Further, the chronostratigraphic column 306 may also include a time selector 314, which may be a scroll bar in some embodiments. The time selector 314 may permit a user to scroll (e.g., vertically) through time in the chronostratigraphic column 306. The chronostratigraphic column 306 may also include a menu button 311, which may be selectable to expand the chronostratigraphic column 306 (e.g., laterally) and provide additional details about each of the elements 312, such as by populating the elements 312 with the mnemonics of the time durations that they represent.

The stratigraphic column 308 may also include elements (e.g., cells) 316, which may correspond to the local stratigraphy of the displayed geographical/geological area in the interface 302. Accordingly, this column 308 may vary depending on the location displayed in the interface 302, as provided by reference to the chronostratigraphic reference timeline in the column 306. In particular, the elements 316 may be arranged to illustrate a relationship with the chronostratigraphic elements 312. For example, the elements 316 that are displayed may correspond to those within the vertical extent of the time selector 314. That is, the height and position of the time selector 314 in the chronostratigraphic column 306 may dictate which elements 316 are in view.

Further, the stratigraphic column 308 may include a granularity selector 317. The granulator selector 317 may be selectable by a user to change the interval represented by individual elements 316, e.g. by partitioning or combining elements 316 (which, again, may be visualized in various different ways). The granularity selector 317 may also be configured to change the height of the time selector 314, e.g., to reduce the time interval displayed in the stratigraphic column 308. In a simple example of changing granularity, a parent element 316 may be divided into two or more child elements 316, or a child element 316 may be combined with one or more other child elements 316 to form a parent element 316. Again, however, the relationship may not be straightforward, but may still be represented in the stratigraphic navigator 300, as described herein.

The stratigraphic column 308 may visualize lithostratigraphic information. The information structure of the lithostratigraphy may be more complex than the chronostratigraphy, as different elements 316 and different granularities may have more than one parent and/or more than one child. Some elements may overlap without a match to the various chronostratigraphic ages (in which case, the absolute age, e.g., in millions of years, may be referenced).

The labels used in a stratigraphic column 308, unlike (in some embodiments) the chronostratigraphic column 306, may vary from one basin to another, and potentially from user to user. These names may be applied based on knowledge acquired by different entities at different times and organized by different people. Indeed, the names of the lithologies may depend on the geographical/local names of the Earth. Therefore, though the stratigraphic column 308 may be closely linked to the chronostratigraphic column 306, they may include different data.

Additionally, a button 319 may be included in at least some of the elements 316 in the stratigraphic column 308. The button 319 may represent that geological data for the strata represented by the element 316 is available. The button 319 may be clicked on or hovered over to reveal the geological data associated therewith. For example, individual stratigraphic elements 316 (e.g., representing cyclostratigraphic, lithostratigraphic, biostratigraphic objects, etc.) may hold a piece of information related to the stratigraphic layer associated therewith. The data can be a number of markers, a status, or any value related to the object of the system/application using the stratigraphic navigator 300. Such data depends on the nature of the application and what is meaningful to the user, and thus the data represented by the button 319 may be dynamically determined and different depending on the type of graphical geoscience interface 302 that is actively being employed/visualized.

Figure 4A:
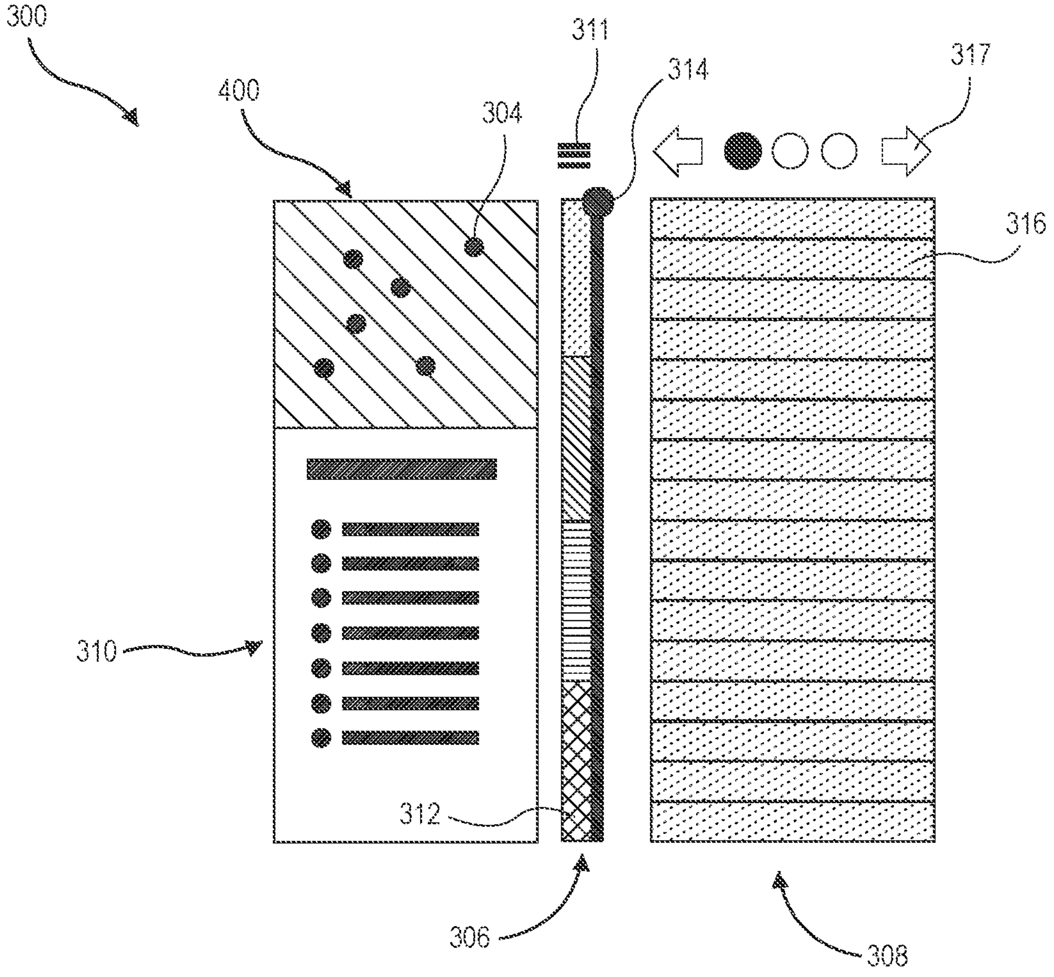
FIGS. 4A, 4B, 4C, 4D, and 4E illustrate additional views of the stratigraphic navigator, depicting various different aspects and operations thereof, according to an embodiment.

Further, the list of wells 310 may include a display of names, locations, or other well attributes or well properties representing the wells 304 in the display on the interface 302. Individual wells 304 may host one or more types of metadata, such as coordinates, unit systems, trajectories, or any information describing the identity of each well so that any domain expert, depending, e.g., on the focus of the application, can visualize the wells on the map. In some embodiments, the metadata may be customizable. Filters may be applied to the list 310. The list 310 may be linked and synchronized to the map, either represented on a larger area of the screen or in a smaller widget. FIG. 4A illustrates an example of the stratigraphic navigator 300 showing such a map 400 in a widget. In such case, the primary view (where the map is in FIG. 3) may display other information, such as well logs or the like.

Figure 4B:
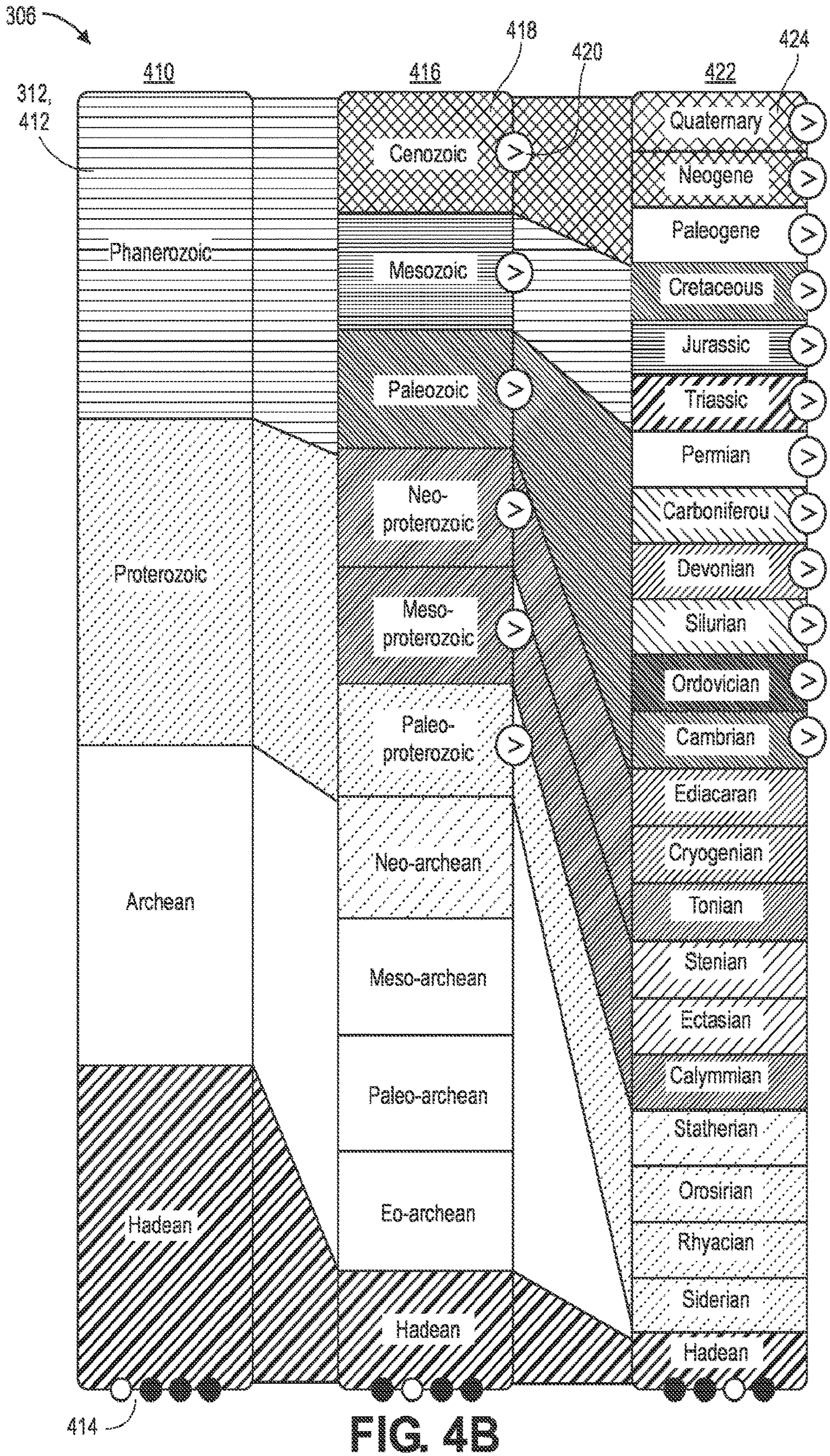

FIG. 4B illustrates the chronostratigraphic column 306 in greater detail, according to an embodiment. As mentioned above, the elements 312 may be adjusted to correspond to different types of time durations, e.g., in response to selection of the chronostratigraphic granularity menu button 311 (FIG. 3). Further, the relationship between the different types of time durations may be visualized in the stratigraphic navigator 300. For example, the column 306 may initially display the elements at the eonothem/eon level, as provided in sub-column 410. As such, individual elements 412 in sub-column 410 may represent one eonothem/eon. A granularity selector 414 may be used to adjust the granularity of the column 308, e.g., by displaying another sub-column 416. Individual elements 418 of the second sub-column 416 may represent individual erathems/era. This may be repeated, e.g., using the granularity selector 414 to produce sub-column 422, which may have elements 424 at a system/period level. Color-coding, lines between sub-columns, etc., may be employed to show the relationships between the elements 412, 418, 424.

Further, whether a given element 418 has sub-elements (e.g., elements 424) associated therewith may be indicated by buttons 420. The buttons 420 may be responsive to user interaction, e.g., a mouse click or hover, so as to provide a quick view of the elements 424 associated therewith. It will be appreciated that the illustration of FIG. 4A may be conceptual, with a single one of the sub-columns 410, 416, 422 being displayed at one time.

Figure 4C:
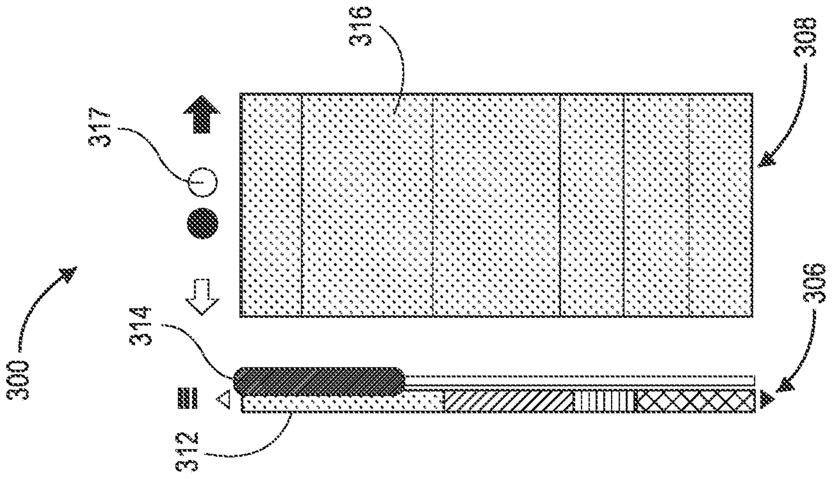
Figure 4D:
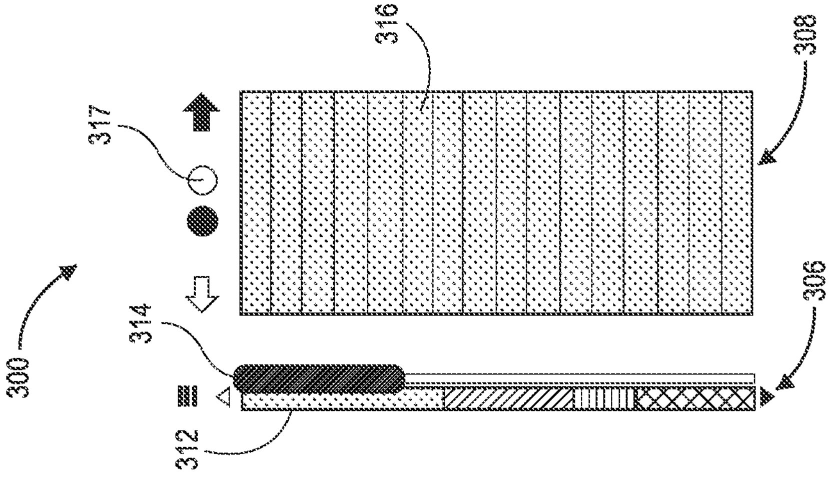
Figure 4E:
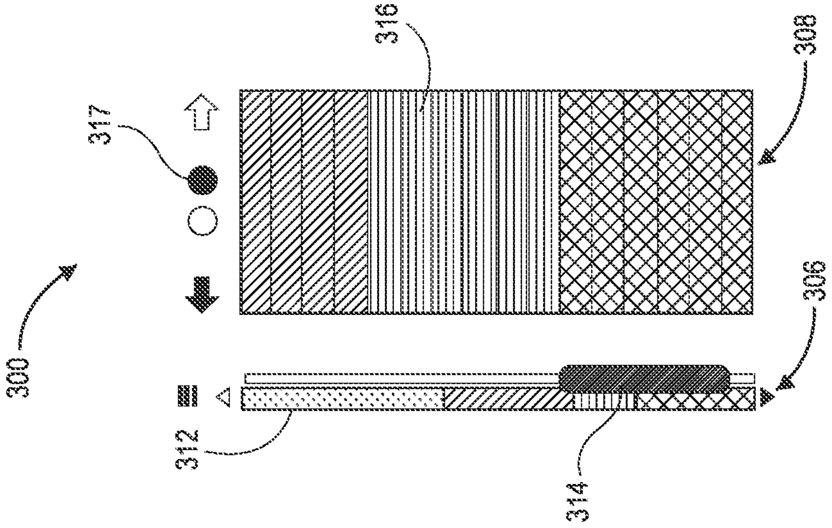

FIGS. 4C, 4D, and 4E illustrate an example of an operation of the selectors 314, 317 in the stratigraphic navigator 300, according to an embodiment. By the provision of two selectors 314, 317, two "axis" navigation is implemented in the stratigraphic navigator 300. For example, scrolling up/down with the selector 314 permits navigation in one direction, and selecting arrows or otherwise navigating side-to-side using the selector 317 permits navigation in another direction. Conceptually, the stratigraphic navigator 300 can be considered to provide a large image, while a portion of this larger image is in display at any given time, and another portion is not visible. The portion that is visible can be adjusted through multi-axis navigation using the selectors 314, 317.

For example, as shown in FIG. 4C, the time selector 314 may be in a first position, proximal to a top (e.g., youngest) region of the chronostratigraphic column 306. The time selector 314 in this embodiment is not long enough to span the entirety of the uppermost element 312 of the column 306. The height of the elements 312 may be related to the relative length of time, depth intervals in the local geology, etc., associated with the individual elements 312. In other embodiments, the elements 312 may be uniform in height, or the height may be determined based on other factors. Since the time selector 314 does not span the uppermost element 312 in this view, the elements 316 of the stratigraphic column 308 that are displayed are associated with the uppermost element 312. The heights thereof may again be related to physical characteristics of the local geology, time duration, or may be uniform or constructed based on other factors.

As shown by comparison between FIGS. 4C and 4D, the granulator selector 317 may be used to increase the number of stratigraphic elements 316 that are visible, e.g., by reducing the heights thereof. This may be done by partitioning the stratigraphic elements 316 into representations of shorter geological time or depth intervals, which may be conceptualized as scrolling to the right, bringing columns of greater granularity/higher depth resolution into view. In some embodiments, the increase in granularity may be accompanied by a reduction in the overall interval displayed by the column 306, e.g., to avoid text or other data contained within the individual elements 316 from becoming too small to read. For example, in response to a selection of the granularity selector 317, the newly-visible elements (e.g., child elements or parent elements) may slide into view in the appropriate direction.

As shown by a comparison between FIGS. 4C and 4E, the time selector 314 may be shifted downward along the chronostratigraphic column 306. As a result, the elements 316 of the stratigraphic column 308 may change. In this example, the selector 314 spans at least a portion of three different elements 316, and thus the corresponding elements 316 are displayed, potentially with borders representing the demarcation between the chronostratigraphic elements 312, as well as in order and otherwise indicating an association (e.g., by color) with one or more of the chronostratigraphic elements 312.

Referring again to FIG. 3, the wells 304 may have a relationship to the chronostratigraphic column elements 312 and the lithostratigraphic column elements 316. The height of the elements 316 in the column 308 may be uniform or may be determined based on characteristics not associated with physical depth/strata thickness. Thus, a layer of the geology, e.g., in the graphical geoscience interface 302, may be customizable, permitting changing the location/depth of its top and/or bottom, and thereby yielding varying thicknesses of the layers, potentially without varying the visual depiction of the individual elements 316. In other embodiments, the height of the elements 316 may be adjustable or otherwise representative of the thickness of the associated layer(s) of the geology.

Figure 5:
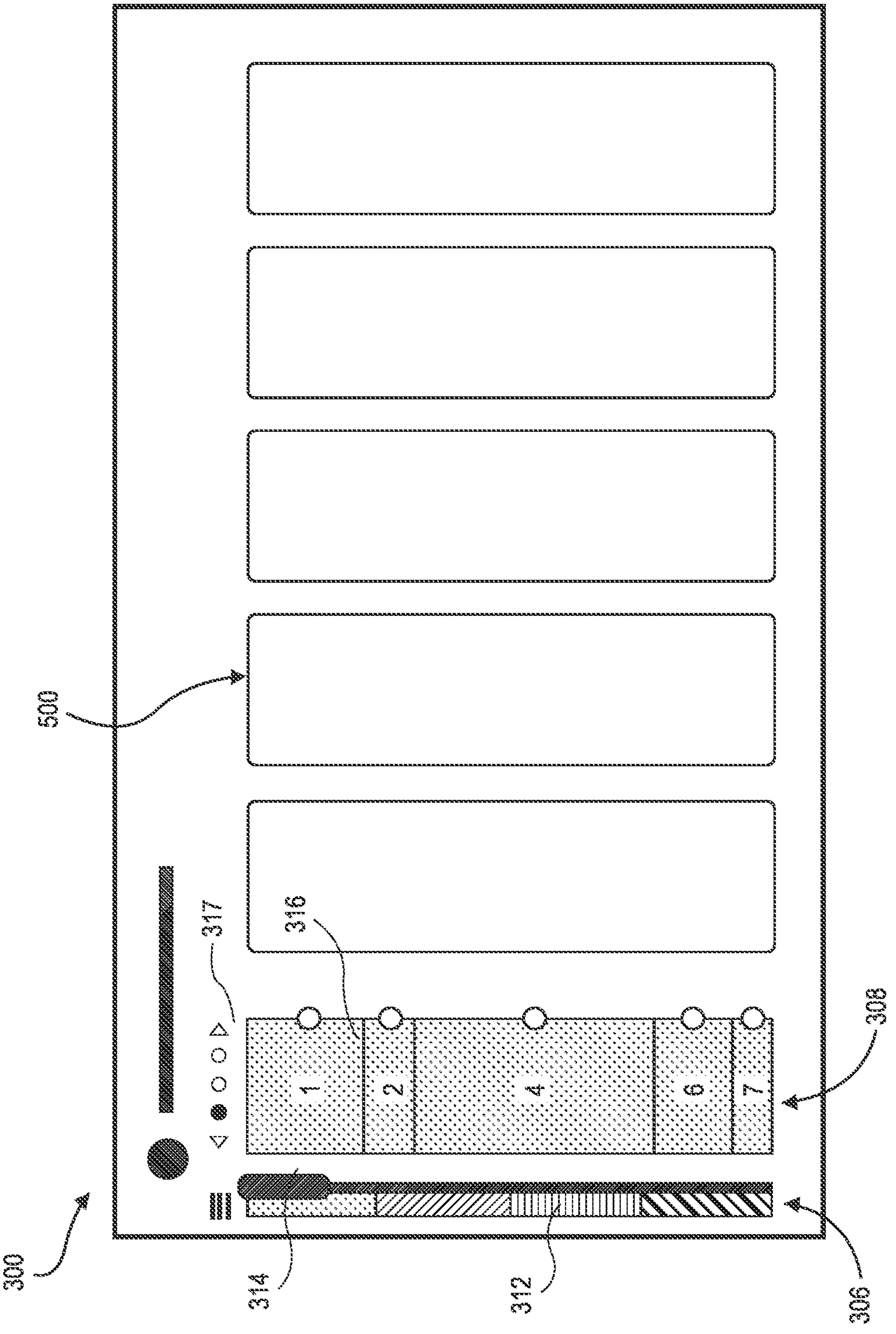
FIG. 5 illustrates a view of the stratigraphic navigator in a "single well view" that presents stratigraphic data directly in line with geological data (e.g., well logs) collected, e.g., from one or more wells, according to an embodiment.

FIG. 5 illustrates the stratigraphic navigator 300 in an alternative view, e.g., displaying additional information for a single well ("single well view") according to an embodiment. In multiple wells view, as discussed above with respect to FIG. 3, providing the stratigraphic navigator 300 in the context of a map or another view that depicts potentially many wells 304, the height of an individual stratigraphic element 316 may be set as a function of available display space, rather than related to the physical parameters of the geological layers. However, in a single well view, as shown in FIG. 5, the height of individual elements 316 may adapt to reflect the ratio of the selected thickness against the total length (or length visible in a single view, e.g., if less than the total) of the well. In some embodiments, the columns 306, 308 may be depicted in the single well view in context with depth-dependent data related to the local geology. For example, well logs 500 may be arranged next to the columns 306, 308, such that the stratigraphic navigator is "in context" with the well logs 500, and, further, depict geological data related to the visualized stratigraphic elements 316.

Going from the global (e.g., potentially large number of wells) view to the single well view may thus result in a transformation or adjustment of the height of the individual elements 316. The black circles representing the wells 304 on the map view (FIG. 3) may display the thickness value of each well for the selected interval, e.g., in response to hovering over or clicking the circle itself. In some embodiments, the thickness value may be displayed in the map in response to hovering or clicking on the circle. In other embodiments, such thickness value may be embedded within the details of the well 304, which may be displayed in a separate window, e.g., after selection.

Figure 6:
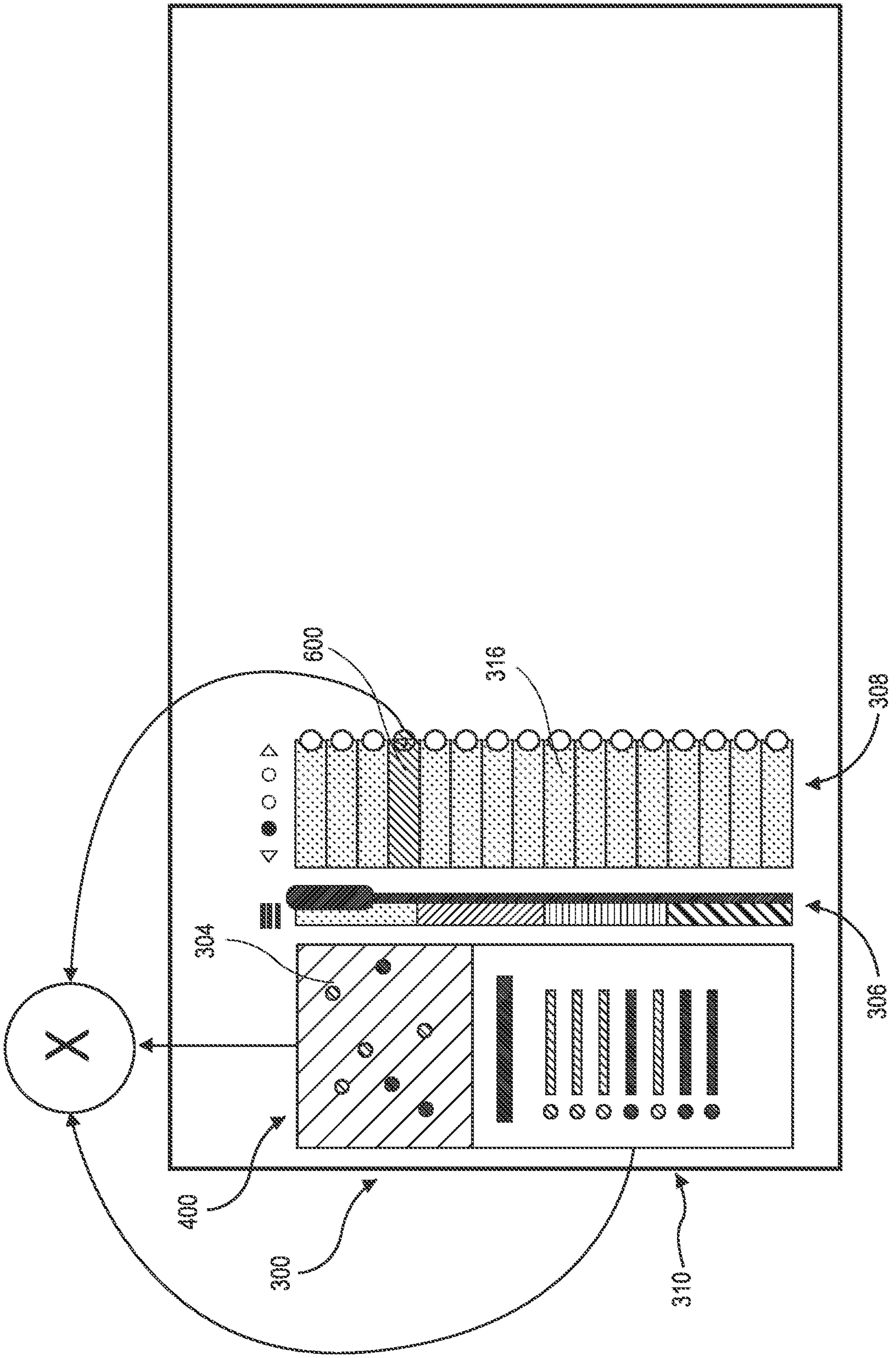
FIG. 6 illustrates a view of an operation of the stratigraphic navigator, showing selection of an element of the stratigraphic navigator resulting in a change in the display of a graphical geoscience interface, according to an embodiment.

As noted above with respect to FIG. 2, selection of elements 316 in the stratigraphic column 308 may result in adjustments to the graphical geoscience interface 302. An example of this is shown in FIG. 6. One of the elements 316 is selected ("the selected element 600"), e.g., via user input (e.g., a mouse click). In response, the stratigraphic navigator 300 may highlight wells 304 on the map 400 that include (or, alternatively, those wells 304 that do not include) the stratigraphic layer represented by the selected element 600. Likewise, the stratigraphic navigator 300 may highlight the wells 304 in the list 310 that include (or do not include) the stratigraphic layer represented by the selected element 600. The reverse relationship may also or instead be employed, such that selection of a well 304 in either the list 310 or the map 400 may result in highlighting one or more elements 316 in the stratigraphic column 308 that are included/not include in the well 304. In other embodiments, the highlighting may also be determined depending on information that is available, e.g., that the element 316 contains data related to the stratigraphy of the well 304 selected.

Figure 7A:
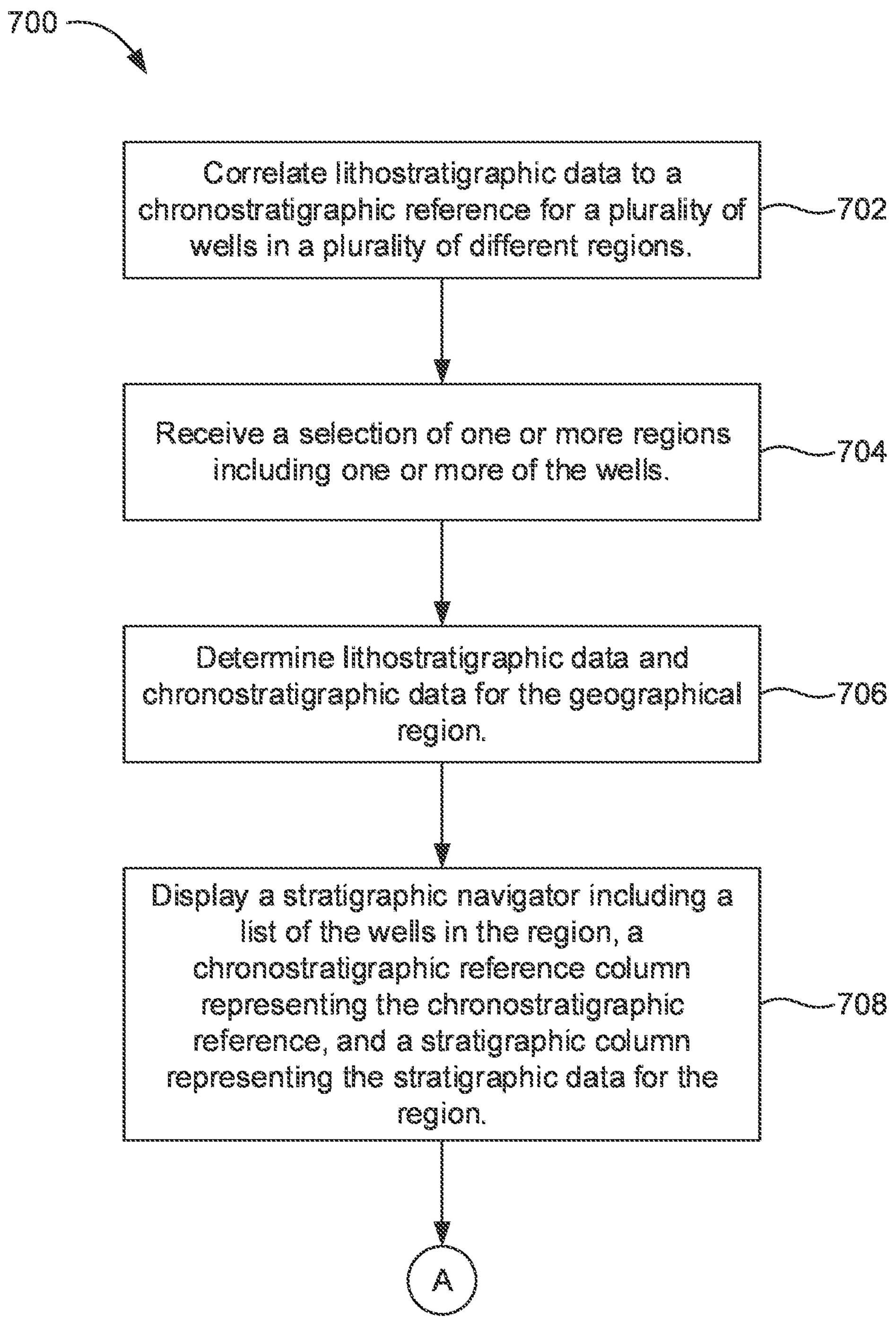
FIGS. 7A and 7B illustrate a flowchart of a method for navigating a geological environment, according to an embodiment.
Figure 7B:
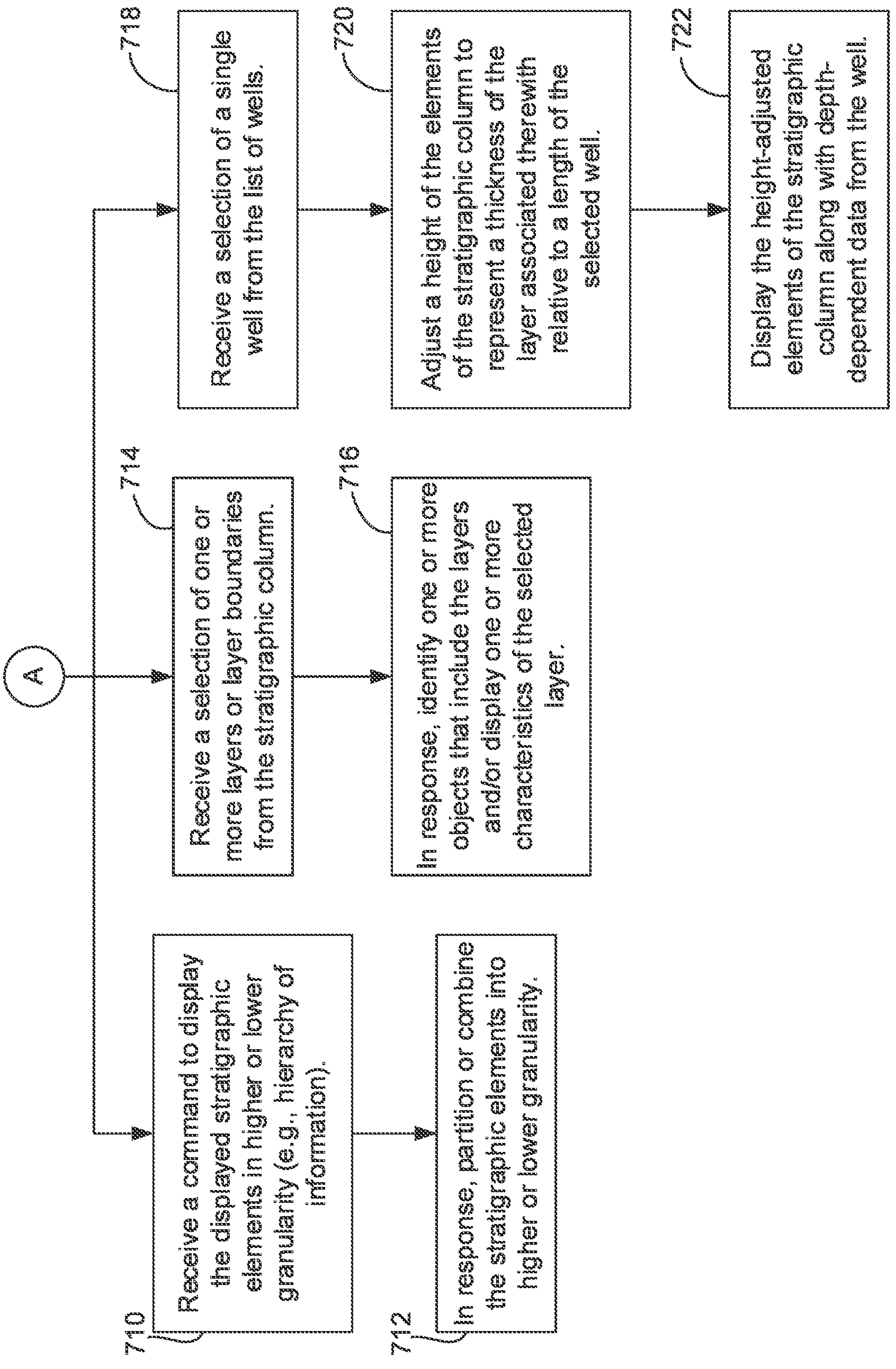

FIGS. 7A and 7B illustrate a flowchart of a method 700 for navigating a geologic environment, according to an embodiment. The method 700 may proceed at least in part using the stratigraphic navigator 300. Thus, the method 700 may be described herein with reference thereto by way of example. Further, various aspects of the method 700 may be conducted in the order described herein or in any other order, various aspects may also be combined, conducted in parallel, or condensed, without departing from the scope of the present disclosure.

The method 700 may begin by building a database of stratigraphical data (e.g., columns or charts) collected from different geographical regions or corresponding to various sub-type of stratigraphical data. The geology of the different regions may, for example, have different lithostratigraphies, such that a direct comparison of the same depth intervals may not be appropriate. Thus, the method 700 may include correlating lithostratigraphic data collected from one or more regions to a chronostratigraphic reference (e.g., timeline, as discussed above), as at 702. This data may be stored in a persistent format for access at a later time. The chronostratigraphic reference may provide for a "translation" of the depth-based data to a time-based reference that can be carried forward to other regions for comparison and form at least a partial basis for inference of data at these other locations.

The method 700 may then proceed to displaying the data that is collected in a format that is configured to enhance the efficiency of a user's experience with a graphical geoscience interface. For example, the method 700 may include receiving, as at 704, a selection of one or more regions in such a graphical geoscience interface, e.g., one of the regions for which data was correlated at 702. The one or more regions may thus have lithostratigraphic information available in back-end storage, e.g., in the database discussed above. The method 700 may thus include determining (e.g., by reference to the database) such lithostratigraphic data using the data that was previously correlated, as at 706.

The method 700 may then include displaying a stratigraphic navigator, as at 708, such as the stratigraphic navigator 300 of FIG. 3, including a list of wells 310 in the region (or any other relevant objects), a chronostratigraphic column 306 that represents the chronostratigraphic data, and a stratigraphic column 308 representing the stratigraphic data for the region. As discussed above, the chronostratigraphic reference timeline may be static, or updated intermittently, and thus may provide a mode for translating depth-based data to geological time-based data, which may permit stratigraphic comparisons between regions. In some embodiments, the chronostratigraphic column 306 may display the entirety of the chronostratigraphic reference timeline, e.g., in relatively high-level timescale so that a user can scroll through to a time duration of interest (e.g., using the time selector 314). As described above, the stratigraphic column 308 may depict the elements 316 corresponding to the selected portion of the chronostratigraphic column 306.

The method 700 may then proceed to interacting with the user and the graphical geoscience interface in which the stratigraphic navigator 300 is presented, permitting the user to quickly reference and apply data to form inferences about a subsurface domain of interest. The method 700 may, for example, include receiving a command to display the displayed elements 316 of the stratigraphic column 308 and/or the elements 312 of the chronostratigraphic column 306 in higher or lower resolution (e.g., via the granularity selector 317 and/or 414), as at 710. This is shown in and discussed above, for example, with reference to FIGS. 4C-4E. In response, as at 712, the method 700 may partition or combine the stratigraphic elements 316 of the column 308 to depict the selected portion of the subsurface in greater or lesser detail, depending on the user's input.

Additionally, the method 700 may include receiving a selection of one or more layers (strata) in the stratigraphic column 308, as at 714. This may be accomplished by using a mouse or another input device to select one or more of the elements 316 of the stratigraphic column 308. In response, as at 716, geological data related to the selected layer (e.g., depth interval) may be displayed, e.g., in a (seismic) cross-section, well log, or another geological image or model. Additionally or alternatively, elements of the graphical geoscience interface may be identified, e.g., as depicted in FIG. 6. For example, wells that extend through the selected layer may be highlighted, or wells that do not extend through the selected layer may be highlighted. In other embodiments, the geological data may identify one or more different objects contained in the layer corresponding to the selected stratigraphic element 316.

In an embodiment, the method 700 may also include receiving a selection of a single well, e.g., in the list of wells 310 or in the graphical geoscience interface 302, as at 718. As discussed above with reference to FIG. 5, the method 700 may also include, as at 720, adjusting a height of the elements 316 of the stratigraphic column 308 to represent a physical thickness of the layer(s) associated with the elements 316, e.g., relative to a length of the selected well. The method 700 may also include displaying, as at 722, the height-adjusted elements 316 of the stratigraphic column 308 along with depth-dependent (e.g., geological) data related to the well.

Figure 8:
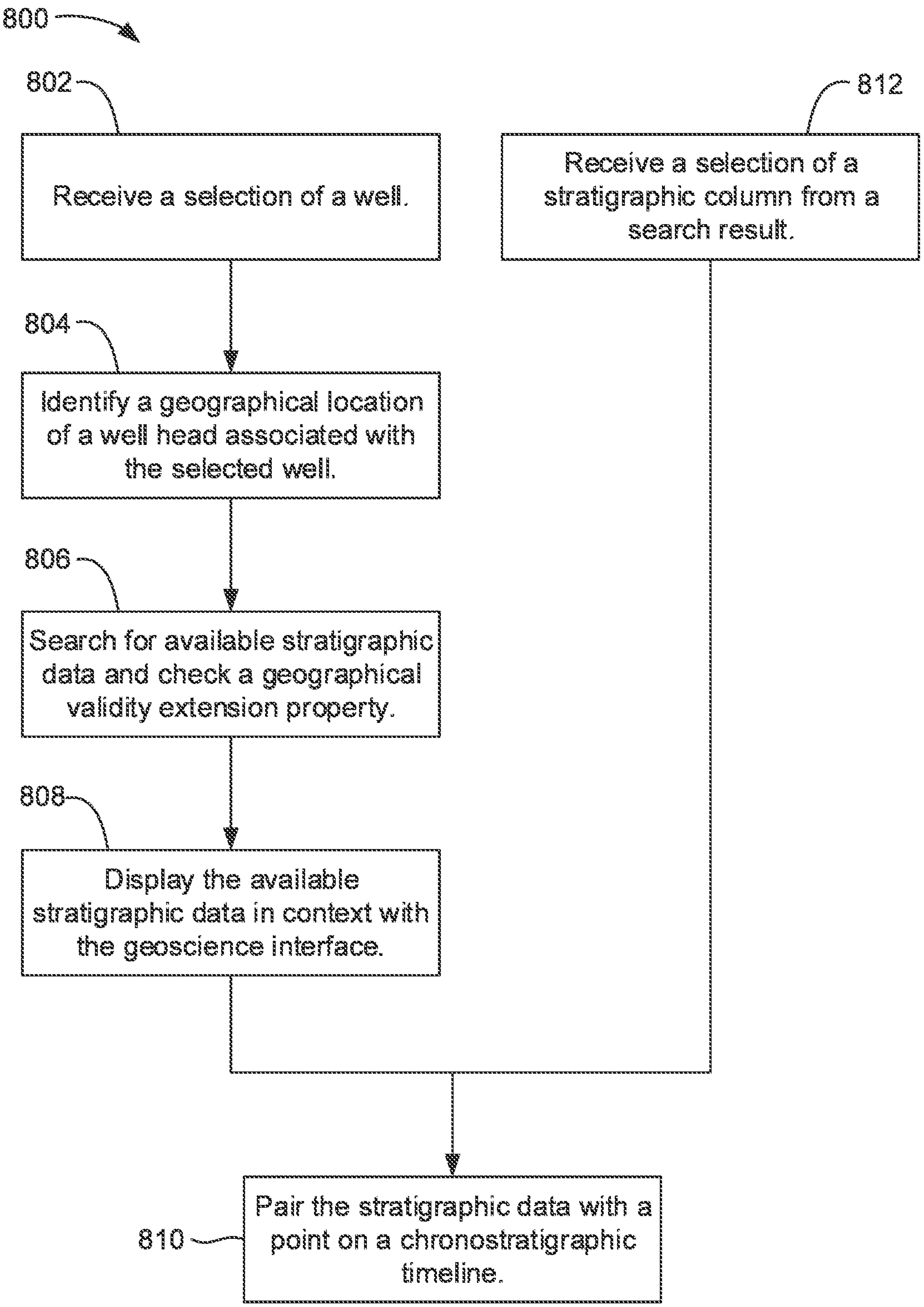
FIG. 8 illustrates a flowchart of a method for constructing a knowledge base for the stratigraphical navigator, according to an embodiment.

FIG. 8 illustrates a flowchart of a method 800 for navigating a geological environment, e.g., through the implementation of the stratigraphic navigator 300 in context with a graphical geoscience interface, according to an embodiment. The method 800 may be illustrative of at least a part of the method 700, according to an embodiment. Further, various aspects of the method 800 may be conducted in the order described herein or in any other order, various aspects may also be combined, conducted in parallel, or condensed, without departing from the scope of the present disclosure.

The method 800 may include receiving a selection of a well, as at 802. As discussed above, in at least one embodiment, the graphical geoscience interface may provide a map view of a region, along with circles or other items that represent well locations, e.g., at the surface of the Earth. The stratigraphic navigator 300 may also provide a list of wells in the region. Accordingly, the method 800 may receive a selection from the list of wells or of one or more of the wells on the map in the graphical geoscience interface, and then may identify a geographical location of a well head associated with the well selection, as at 804. The well head may be in existence or planned but not yet drilled, or in any other state of completion.

The method 800 may then access geological data related to the geographical location of the well head, as at 806. The method 800 may, for example, check for stratigraphic data that has been collected from the local region and check for a geographical validity extension property. In the format that is created to store the stratigraphic columns and chart in a database, a specific geographical validity extension property may be included to indicate a validity of a specific stratigraphic object within a corresponding geographical area (e.g., a rectangle, a circle, a basin shape), as defined by one or more anchor points. The position of the anchor points may be defined by a coordinate system (e.g., a Cartesian X, Y system or a more complex system). The coordinates may be transformed into geographical positioning. Therefore, such a stratigraphic object may be considered "valid" within the shape defined by these anchor points. Thus, when interrogating a system, by comparing geographical position of wells and stratigraphic object's geographical validity, the system may decide what is relevant for a particular use case.

The available stratigraphic data may then be displayed in context with the geological interface, as at 808. The available stratigraphic data may also be paired with a point on a chronostratigraphic reference timeline, which may permit conversion of local depth-dependent data to an age standard that may be applicable to multiple regions.

In addition, the method 800 may receive a selection of an element of the stratigraphic column, as at 810. For example, a user may type in a mnemonic representing a particular stratum, and the stratigraphic navigator 300 may employ a search technique to associate the mnemonic with a particular element 316 of the stratigraphic column 308. The selected stratigraphic element may then be paired with the point on the chronostratigraphic reference timeline at 810.

Figure 9A:
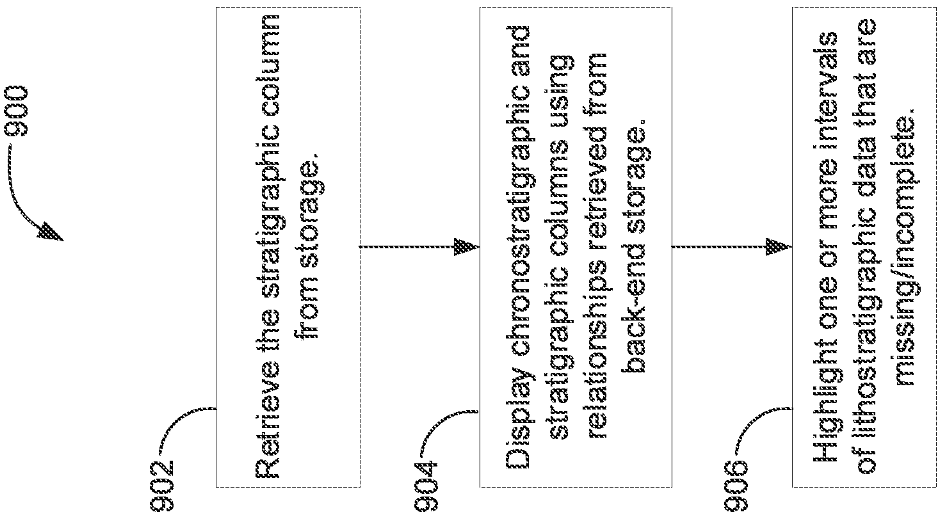
FIGS. 9A and 9B illustrate flowcharts of methods for displaying the stratigraphical navigator, according to an embodiment.
Figure 9B:
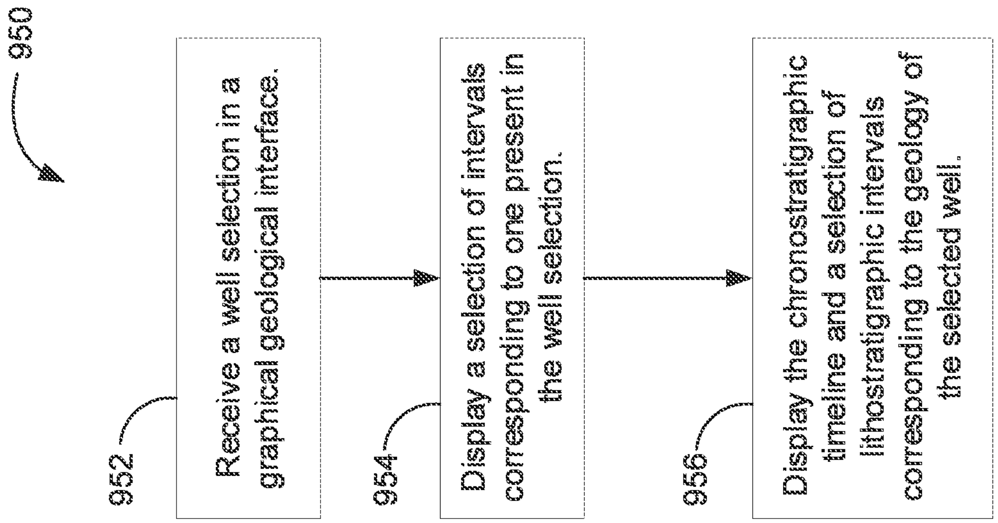

FIGS. 9A and 9B illustrate methods 900, 950, respectively, for displaying the stratigraphic navigator 300 in context with a graphical geoscience interface, according to an embodiment. Further, various aspects of the methods 900, 950 may be conducted in the order described herein or in any other order, various aspects may also be combined, conducted in parallel, or condensed, without departing from the scope of the present disclosure.

Beginning with FIG. 9A, the method 900 may include, for a particular geographical region that may be displayed in a graphical geoscience interface, retrieving the stratigraphic column 308 applicable thereto from back-end storage, as at 902. The method 900 may also include displaying a chronostratigraphic reference timeline (e.g., the chronostratigraphic column 306) along with lithostratigraphic data (e.g., the stratigraphic column 308) in association therewith, e.g., side-by-side, showing the relationship therebetween retrieved from storage, as at 904. Further, the columns 306, 308 may be displayed in context with the graphical geoscience interface (e.g. overlaying, next to, in a separate, concurrently-present display, etc.). The method 900 may then include highlighting one or more intervals (e.g., in the stratigraphic column 308) of lithostratigraphic data that are missing or incomplete, as at 906.

In FIG. 9B, the method 950 may include receiving a well selection in the graphical geoscience interface (e.g., a selection of a well from a list or on a map), as at 952. The method 950 may include displaying a selection of intervals corresponding to one present in the selected well, as at 954. The method 950 may also include displaying the chronostratigraphic timeline and a selection of lithostratigraphic intervals (e.g., elements 316 of the stratigraphic column 308) corresponding to the geology of the selected well (e.g., through which the well extends), as at 956.

Figure 10A:
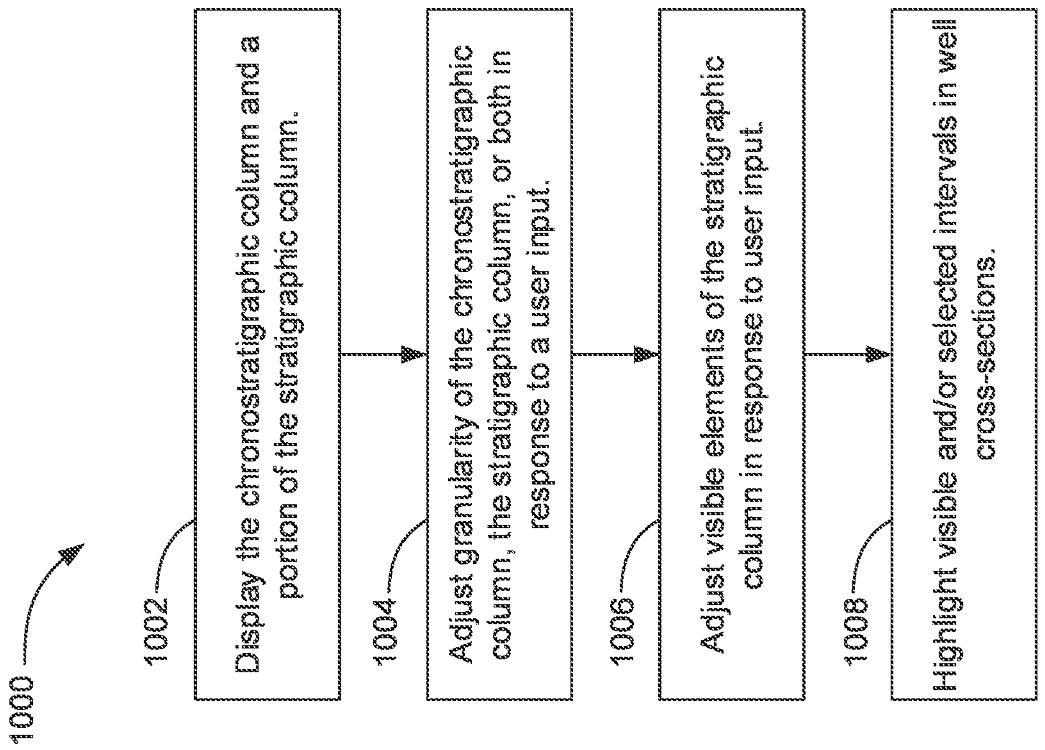
FIGS. 10A and 10B illustrate flowcharts of methods for interacting with a user via the stratigraphic navigator, e.g., to facilitate navigation of the geological environment, according to an embodiment.
Figure 10B:
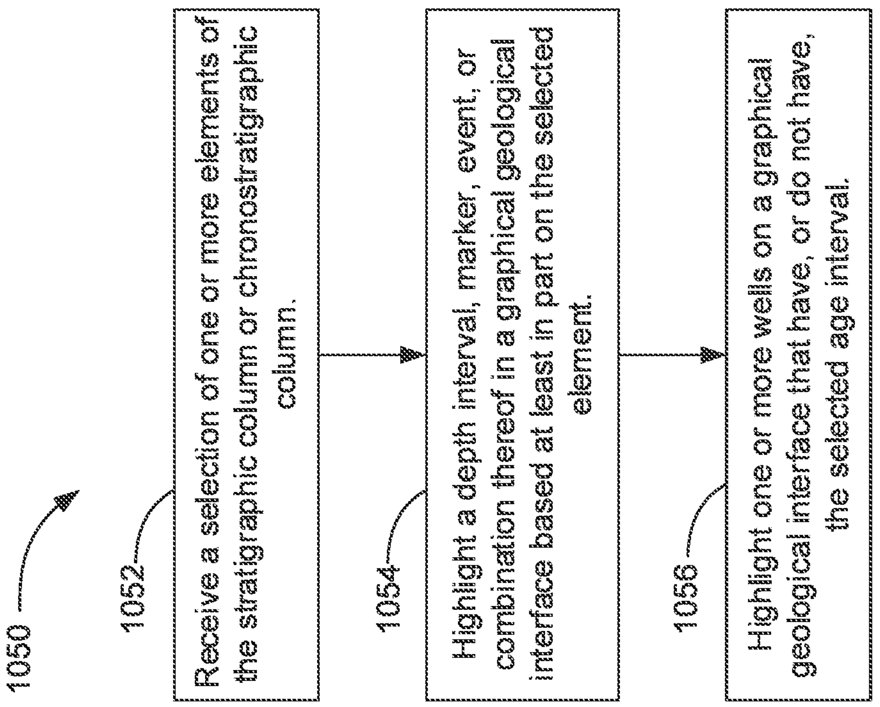
Figure 12A:
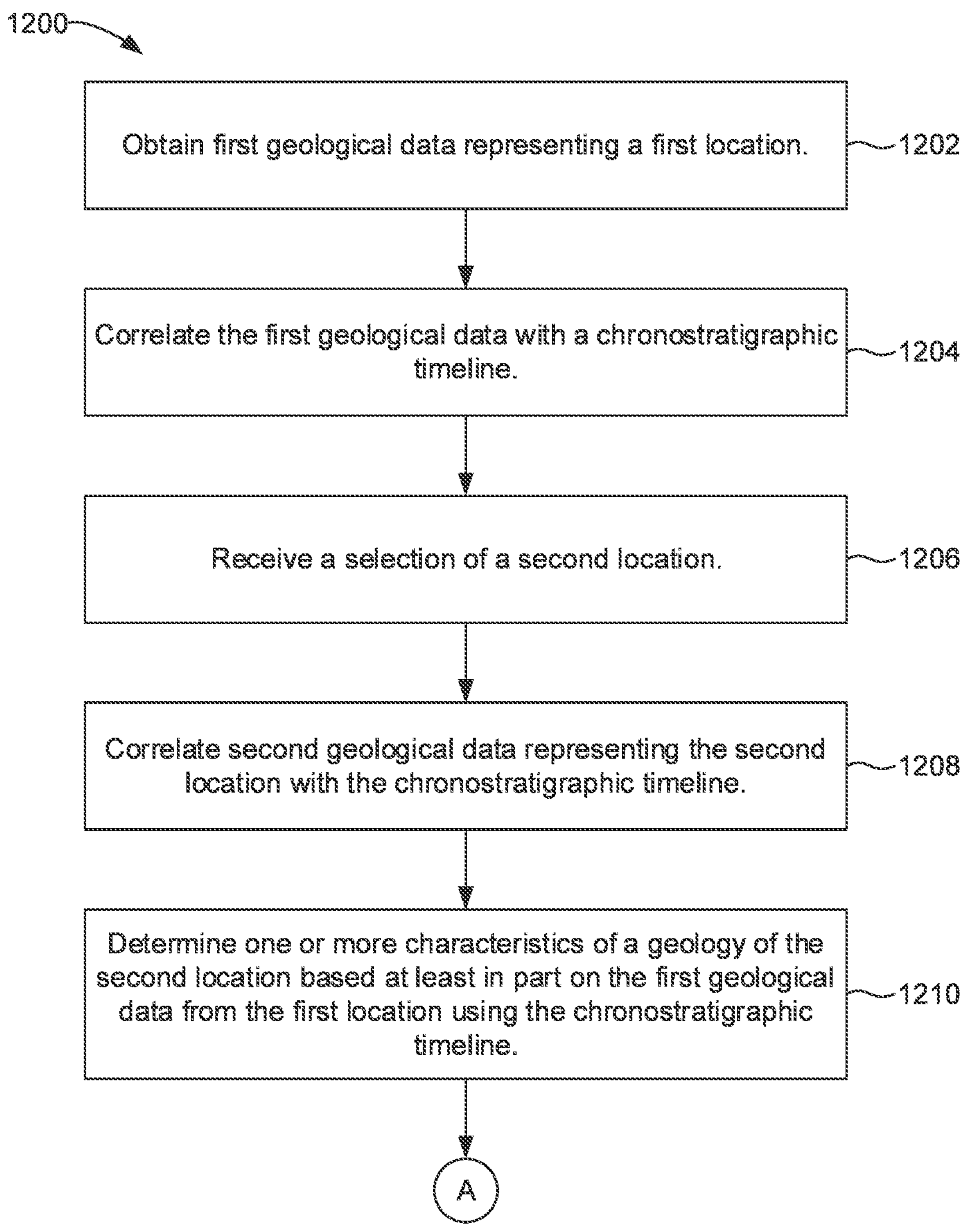
FIGS. 12A, 12B, 12C, 12D, and 12E illustrate a flowchart of a method for navigating a geological environment, according to an embodiment.
Figure 12B:
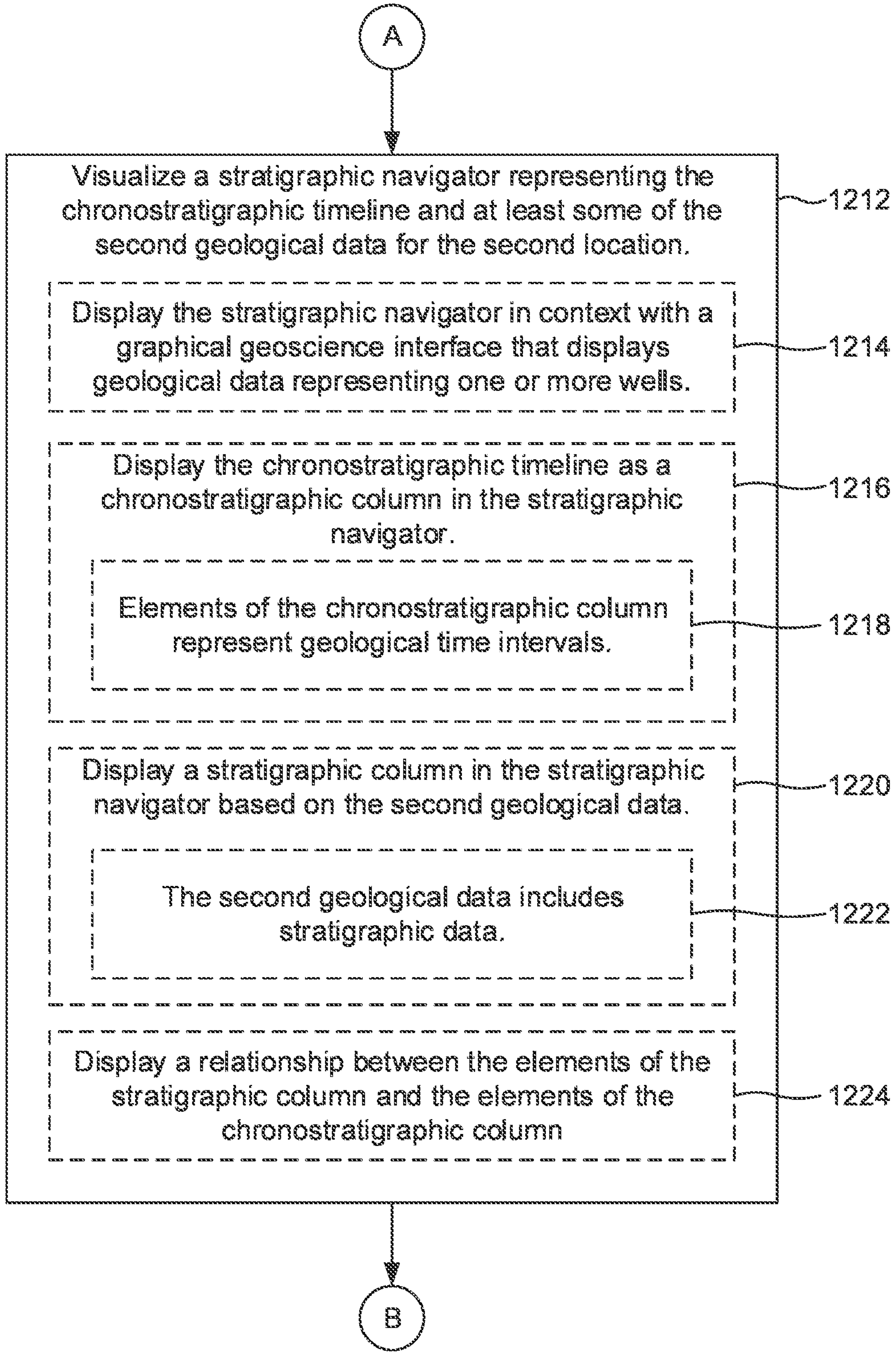
Figure 12C:
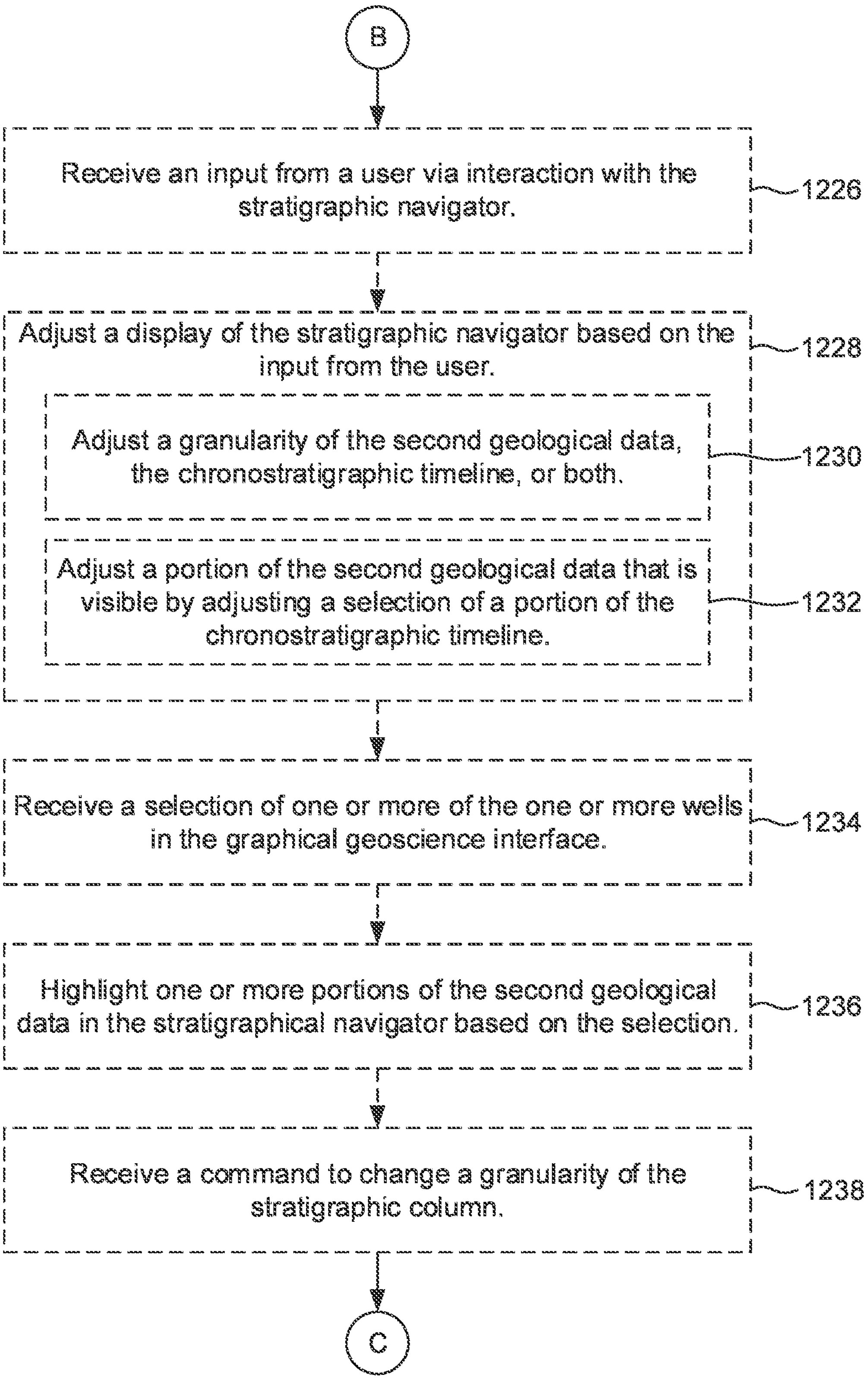
Figure 12D:
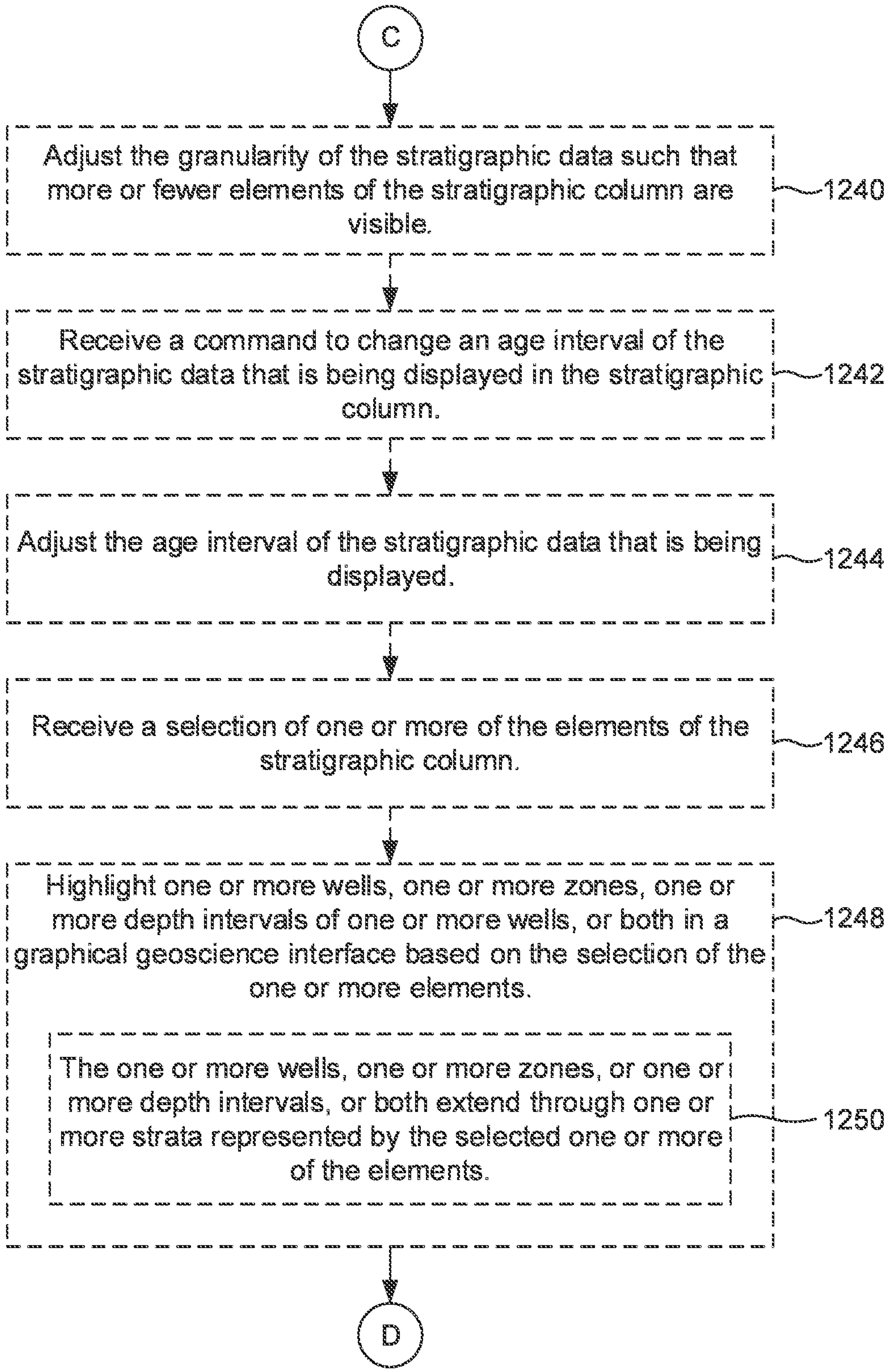
Figure 12E:
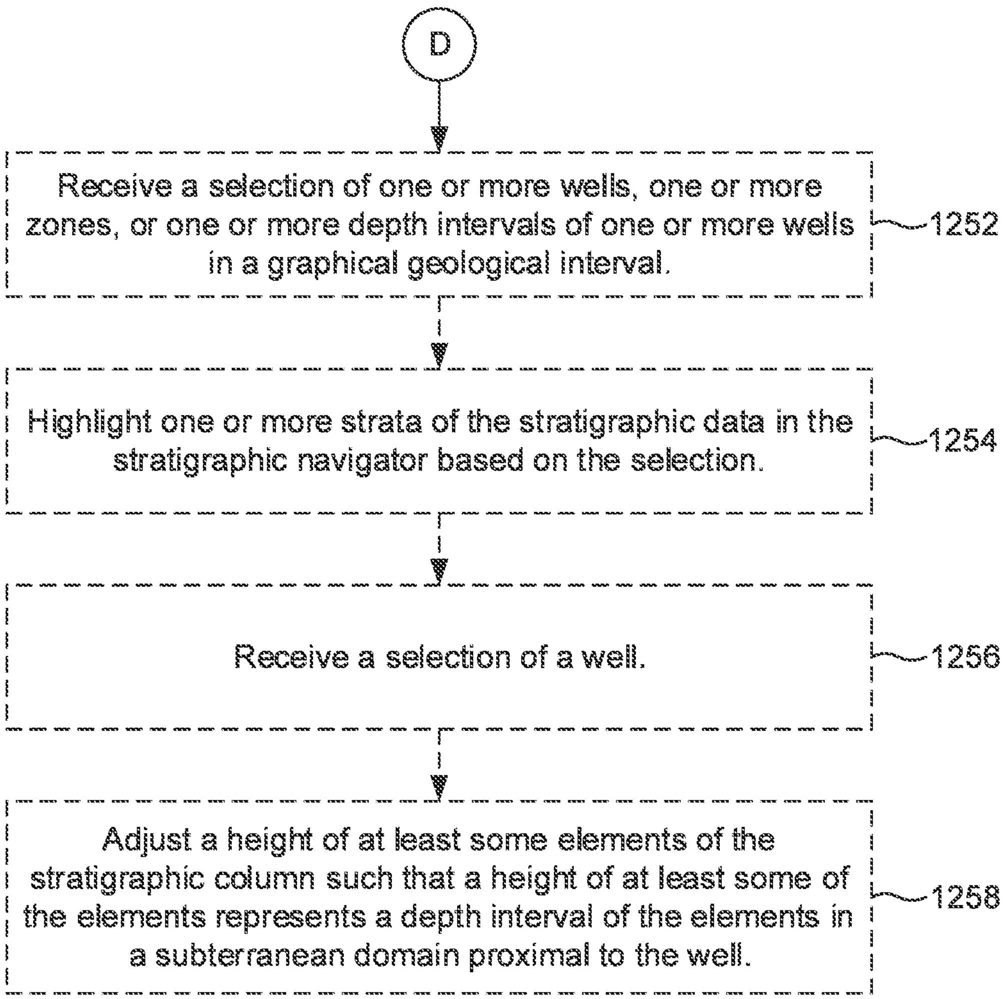

FIGS. 10A and 10B illustrate flowcharts of methods 1000 and 1050, respectively, for navigating a geological environment, specifically, interacting with a user via the stratigraphic navigator 300, according to an embodiment. Various aspects of the method 1000, 1050 may be conducted in the order described herein or in any other order, various aspects may also be combined, conducted in parallel, or condensed, without departing from the scope of the present disclosure.

In FIG. 10A, the method 1000 includes displaying the chronostratigraphic column 306, along with a portion of the stratigraphic column 308, as at 1002. Another portion of the stratigraphic column 308 may be obscured from view, and higher or lower levels of granularity for either or both columns 306, 308 may likewise not be in view.

The method 1000 may include adjusting the granularity of the chronostratigraphic column 306, the stratigraphic column 308, or both, in response to user input, e.g., via a granularity selector 317, 414, as at 1004. This may permit a user to scroll through and select or otherwise extract information from elements 312, 316 of different levels of time or depth specificity.

Additionally or alternatively, the method 1000 may include adjusting visible elements of the stratigraphic column in response to user input, as at 1006. Such user input may be via the time selector 314, which may permit adjusting the displayed chronostratigraphic time-intervals that encompass the stratigraphic elements 312 that are visible. Further, in response to user selections or other input, the method 1000 may include highlighting visible and/or selected intervals in well cross-sections, as at 1008.

Referring to FIG. 10B, the method 1050 may include receiving a selection of one or more elements 316 of the stratigraphic column 308 and/or one or more elements 312 of the chronostratigraphic column 306, as at 1052. The method 1050 may then highlight a depth interval, marker, event, or combination thereof in a graphical geoscience interface based at least in part on the selection, as at 1054. The method 1050 may instead or additionally include highlighting one or more wells in the graphical geoscience interface that have or do not have data related to the selected stratigraphic element(s) 316 and/or chronostratigraphic element(s) 312.

FIG. 11 illustrates a flowchart of another method 1100 for navigating a geological environment, specifically, interacting with a user via the stratigraphic navigator 300, according to an embodiment. Various aspects of the method 1100 may be conducted in the order described herein or in any other order, various aspects may also be combined, conducted in parallel, or condensed, without departing from the scope of the present disclosure.

The method 1100 may include receiving a selection of a well from a graphical geoscience interface, as at 1102, and then adjusting and displaying the stratigraphic data in a column 308, such that relative heights of respective elements 316 of the column 308 represent a depth interval of a corresponding layer, stratum, or other element of the subsurface domain through which the well extends, as at 1104.

FIG. 12 illustrates a flowchart of a method 1200 for navigating a geologic environment, according to an embodiment. The method 1200 may include obtaining first geological data representing a first location, as at 1202 (e.g., FIG. 2, box 202; geological data about multiple locations obtained). The method 1200 may also include correlating the first geological data with a chronostratigraphic timeline, as at 1204 (e.g., FIG. 2, box 204). The method 1200 may include receiving a selection of a second location, as at 1206. The method 1200 may include correlating second geological data representing the second location with the chronostratigraphic timeline, as at 1208 (e.g., FIG. 2, box 204; multiple locations may be correlated). The method 1200 may include determining one or more characteristics of a geology of the second location based at least in part on the first geological data from the first location using the chronostratigraphic timeline, as at 1210 (e.g., FIG. 2, box 212).

The method 1200 may also include visualizing a stratigraphic navigator representing the chronostratigraphic timeline and at least some of the second geological data for the second location, as at 1212 (e.g., FIG. 2, box 208). In an embodiment, visualizing the stratigraphic navigator may include displaying the stratigraphic navigator in context with a graphical geoscience interface that displays geological data representing one or more wells, as at 1214 (e.g., FIG. 2, box 208). In an embodiment, visualizing may include displaying the chronostratigraphic timeline as a chronostratigraphic column in the stratigraphic navigator, as at 1216 (e.g., FIG. 2, box 208). For example, elements of the chronostratigraphic column may represent geological time intervals, as at 1218 (e.g., FIG. 7A, box 708). Further, visualizing may include displaying a stratigraphic column in the stratigraphic navigator based on the second geological data, as at 1218 (e.g., FIG. 7A, box 708). The second geological data may include stratigraphic data, as at 1220, and the stratigraphic column includes elements that represent one or more strata that are local to the second location, as at 1222 (e.g., FIG. 9A, box 904). Visualizing may also include displaying a relationship between the elements of the stratigraphic column and the elements of the chronostratigraphic column, as at 1224 (e.g., FIG. 8, box 810).

In an embodiment, the method 1200 may also include receiving an input from a user via interaction with the stratigraphic navigator, as at 1226 (e.g., FIG. 10A, box 1002). In an embodiment, the method 1200 may include adjusting a display of the stratigraphic navigator based on the input from the user, as at 1228 (e.g., FIG. 10A, box 1004). Adjusting the display may include adjusting a granularity of the second geological data, the chronostratigraphic timeline, or both, as at 1230 (e.g., FIG. 10A, box 1004). Adjusting the display may also or instead include adjusting a portion of the second geological data that is visible by adjusting a selection of a portion of the chronostratigraphic timeline, as at 1232 (e.g., FIG. 10A, box 1006).

In an embodiment, the method 1200 may include receiving a selection of one or more of the one or more wells in the graphical geoscience interface, as at 1234 (e.g., FIG. 9B, box 952). The method 1200 may also include highlighting one or more portions of the second geological data in the stratigraphical navigator based on the selection, as at 1236 (e.g., FIG. 9B, box 954).

In an embodiment, the method 1200 may also include receiving a command to change a granularity of the stratigraphic column, as at 1238 (e.g., FIG. 10A, box 1002). The method 1200 may include adjusting the granularity of the stratigraphic data such that more or fewer elements of the stratigraphic column are visible, as at 1240 (e.g., FIG. 10A, box 1004).

In an embodiment, the method 1200 may include receiving a command to change an age interval of the stratigraphic data that is being displayed in the stratigraphic column, as at 1242. The method 1200 may include adjusting the age interval of the stratigraphic data that is being displayed, as at 1244 (e.g., FIG. 10A, box 1006).

In an embodiment, the method 1200 may include receiving a selection of one or more of the elements of the stratigraphic column, as at 1246 (e.g., FIG. 10B, box 1052). The method 1200 may also include highlighting one or more wells, one or more zones, one or more markers, one or more markers of one or more wells, one or more depth intervals of one or more wells, or a combination thereof in a graphical geoscience interface based on the selection of the one or more elements, as at 1248 (e.g., FIG. 10B, boxes 1054 and 1056). The one or more wells, one or more zones, or one or more depth intervals, one or more markers, one or more markers of one or more wells, or combination thereof extend through one or more strata represented by the selected one or more of the elements, as at 1250 (e.g., FIG. 10B, box 1054).

In an embodiment, the method 1200 may include receiving a selection of one or more wells, one or more zones, or one or more depth intervals of one or more wells in a graphical geological interval, as at 1252 (e.g., FIG. 7B, box 714). The method 1200 may include highlighting one or more strata of the stratigraphic data in the stratigraphic navigator based on the selection, as at 1254 (e.g., FIG. 7B, box 716).

In an embodiment, the method 1200 may include receiving a selection of a well, as at 1256 (e.g., FIG. 7B, box 718). The method 1200 may include adjusting a height of at least some elements of the stratigraphic column such that a height of at least some of the elements represents a depth interval of the elements in a subterranean domain proximal to the well (e.g., FIG. 7B, box 720), as at 1258.

Figure 13:
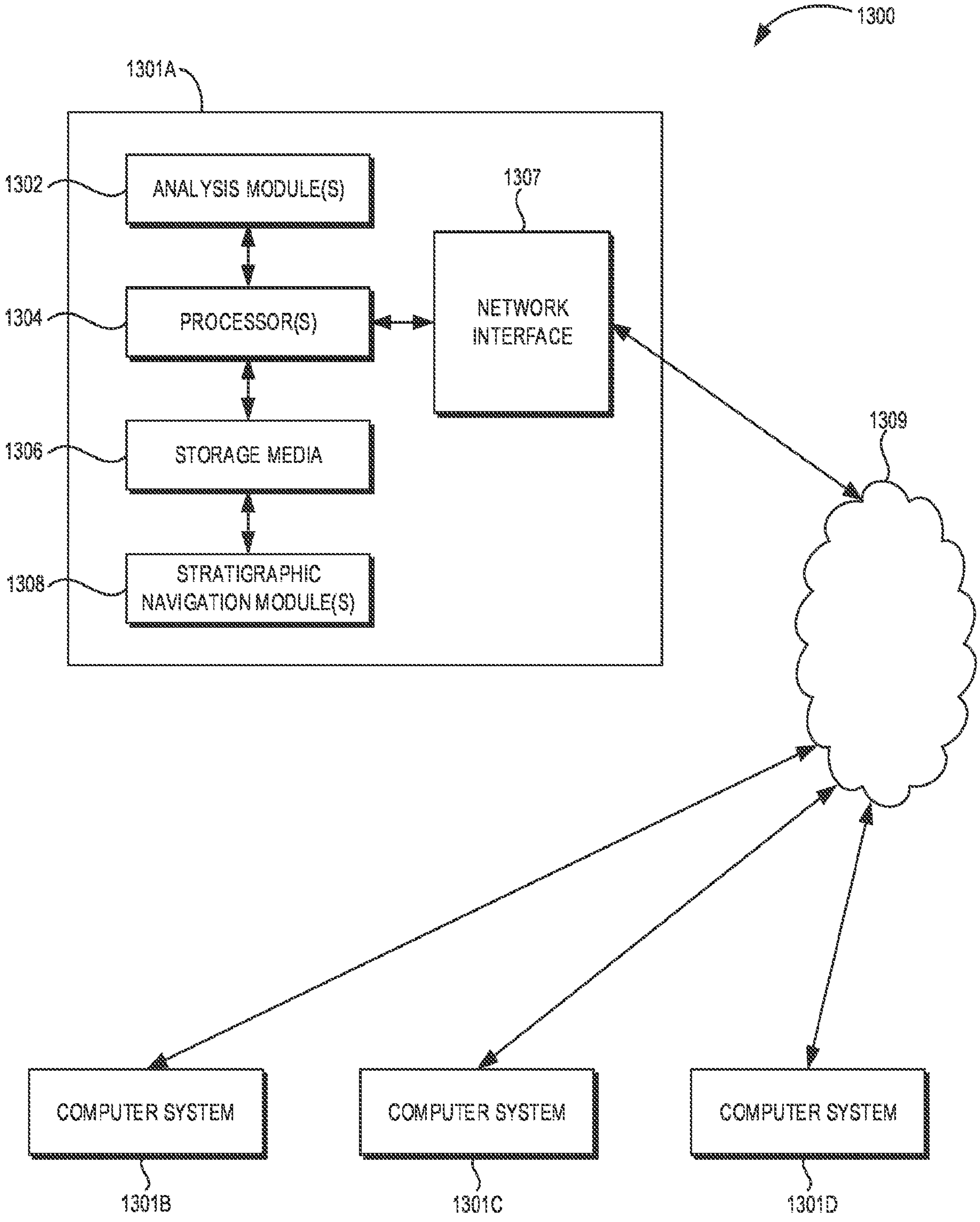
FIG. 13 illustrates a schematic view of a computing system, according to an embodiment.

In some embodiments, the methods of the present disclosure may be executed by a computing system. FIG. 13 illustrates an example of such a computing system 1300, in accordance with some embodiments. The computing system 1300 may include a computer or computer system 1301A, which may be an individual computer system 1301A or an arrangement of distributed computer systems. The computer system 1301A includes one or more analysis modules 1302 that are configured to perform various tasks according to some embodiments, such as one or more methods disclosed herein. To perform these various tasks, the analysis module 1302 executes independently, or in coordination with, one or more processors 1304, which is (or are) connected to one or more storage media 1306. The processor(s) 1304 is (or are) also connected to a network interface 1307 to allow the computer system 1301A to communicate over a data network 1309 with one or more additional computer systems and/or computing systems, such as 1301B, 1301C, and/or 1301D (note that computer systems 1301B, 1301C and/or 1301D may or may not share the same architecture as computer system 1301A, and may be located in different physical locations, e.g., computer systems 1301A and 1301B may be located in a processing facility, while in communication with one or more computer systems such as 1301C and/or 1301D that are located in one or more data centers, and/or located in varying countries on different continents).

A processor may include a microprocessor, microcontroller, processor module or subsystem, programmable integrated circuit, programmable gate array, or another control or computing device.

The storage media 1306 may be implemented as one or more computer-readable or machine-readable storage media. Note that while in the example embodiment of FIG. 13 storage media 1306 is depicted as within computer system 1301A, in some embodiments, storage media 1306 may be distributed within and/or across multiple internal and/or external enclosures of computing system 1301A and/or additional computing systems. Storage media 1306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1300 contains one or more stratigraphic navigation module(s) 1308. In the example of computing system 1300, computer system 1301A includes the stratigraphic navigation module 1308. In some embodiments, a single stratigraphic navigation module may be used to perform some aspects of one or more embodiments of the methods disclosed herein. In other embodiments, a plurality of stratigraphic navigation modules may be used to perform some aspects of methods herein.

It should be appreciated that computing system 1300 is merely one example of a computing system, and that computing system 1300 may have more or fewer components than shown, may combine additional components not depicted in the example embodiment of FIG. 13, and/or computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1300, FIG. 13), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for navigating a geologic environment, comprising:

- obtaining first geological data representing a first location;
- correlating the first geological data with a chronostratigraphic timeline;
- receiving a selection of a second location;
- correlating second geological data representing the second location with the chronostratigraphic timeline;
- determining one or more characteristics of a geology of the second location based at least in part on the first geological data representing the first location using the chronostratigraphic timeline;
- visualizing a stratigraphic navigator representing the chronostratigraphic timeline and at least some of the second geological data for the second location, wherein visualizing the stratigraphic navigator comprises:
  - displaying the chronostratigraphic timeline as a chronostratigraphic column in the stratigraphic navigator, wherein elements of the chronostratigraphic column represent geological time intervals;
  - displaying a stratigraphic column in the stratigraphic navigator based on the second geological data, wherein the second geological data comprises stratigraphic data, and wherein the stratigraphic column includes elements representing one or more strata that are local to the second location; and
  - displaying a relationship between the elements of the stratigraphic column and the elements of the chronostratigraphic column;
- receiving a command to change a granularity of the stratigraphic column;
- adjusting the granularity of the stratigraphic data such that more or fewer elements of the stratigraphic column are visible;
- receiving a selection of a well; and adjusting a height of at least some of the elements of the stratigraphic column such that the height of the at least some of the elements represents a depth interval of the elements in a subterranean domain proximal to the well.

2. The method of claim 1, further comprising:

receiving an input from a user via interaction with the stratigraphic navigator, the input distinct from the command to change the granularity of the stratigraphic column; and adjusting a display of the stratigraphic navigator based on the input from the user, wherein adjusting the display comprises:

adjusting a granularity of the second geological data, the chronostratigraphic timeline, or both, or adjusting a portion of the second geological data that is visible by adjusting a selection of a portion of the chronostratigraphic timeline, or both.

3. The method of claim 1, wherein visualizing the stratigraphic navigator comprises displaying the stratigraphic navigator in context with a graphical geoscience interface that displays geological data representing one or more wells.

4. The method of claim 3, further comprising:

receiving a selection of at least one well of the one or more wells in the graphical geoscience interface; and highlighting elements representing one or more particular strata in the stratigraphic navigator based on the selection, wherein the at least one well extends through the one or more particular strata.

5. The method of claim 1, further comprising:

receiving a command to change an age interval of the stratigraphic data that is being displayed in the stratigraphic column; and adjusting the age interval of the stratigraphic data that is being displayed.

6. The method of claim 1, further comprising:

receiving a selection of one or more of the elements of the stratigraphic column, wherein the one or more of the elements represent one or more particular strata; and highlighting one or more wells, one or more zones, one or more depth intervals of the one or more wells, one or more markers of the one or more wells, or a combination thereof in a graphical geoscience interface based on the selection of the one or more of the elements, wherein the one or more wells, the one or more zones, the one or more depth intervals, or the combination thereof extend through the one or more particular strata represented by the one or more of the elements.

7. The method of claim 1, further comprising:

receiving a selection of one or more wells, one or more zones, one or more depth intervals of the one or more wells, one or more markers of the one or more wells, or a combination thereof in a graphical geological interval; and highlighting one or more particular strata of the stratigraphic data in the stratigraphic navigator based on the selection, wherein the selected one or more wells, the one or more zones, the one or more depth intervals, the one or more markers, or the combination thereof extend through the one or more particular strata.

8. A computing system, comprising:

one or more processors; and a memory system comprising one or more non-transitory, computer-readable media storing instructions that, when executed by at least one of the one or more processors, cause the computing system to perform operations, the operations comprising:

obtaining first geological data representing a first location;

correlating the first geological data with a chronostratigraphic timeline;

receiving a selection of a second location;

correlating second geological data representing the second location with the chronostratigraphic timeline;

determining one or more characteristics of a geology of the second location based at least in part on the first geological data representing the first location using the chronostratigraphic timeline; and visualizing a stratigraphic navigator representing the chronostratigraphic timeline and at least some of the second geological data for the second location, wherein visualizing the stratigraphic navigator comprises:

displaying the chronostratigraphic timeline as a chronostratigraphic column in the stratigraphic navigator, wherein elements of the chronostratigraphic column represent geological time intervals;

displaying a stratigraphic column in the stratigraphic navigator based on the second geological data, wherein the second geological data comprises stratigraphic data, and wherein the stratigraphic column includes elements representing one or more strata that are local to the second location; and displaying a relationship between the elements of the stratigraphic column and the elements of the chronostratigraphic column;

receiving a command to change a granularity of the stratigraphic column;

adjusting the granularity of the stratigraphic data such that more or fewer of the elements of the stratigraphic column are visible;

receiving a command to change an age interval of the stratigraphic data that is being displayed in the stratigraphic column; and adjusting the age interval of the stratigraphic data that is being displayed.

9. The computing system of claim 8, wherein the operations further comprise:

receiving an input from a user via interaction with the stratigraphic navigator, the input distinct from the command to change the granularity of the stratigraphic column; and adjusting a display of the stratigraphic navigator based on the input from the user, wherein adjusting the display comprises:

adjusting a granularity of the second geological data, the chronostratigraphic timeline, or both, or adjusting a portion of the second geological data that is visible by adjusting a selection of a portion of the chronostratigraphic timeline, or both.

10. The computing system of claim 8, wherein visualizing the stratigraphic navigator comprises displaying the stratigraphic navigator in context with a graphical geoscience interface that displays geological data representing one or more wells.

11. The computing system of claim 10, wherein the operations further comprise:

receiving a selection of at least one well of the one or more wells in the graphical geoscience interface; and highlighting elements representing one or more particular strata in the stratigraphic navigator based on the selection, wherein the at least one well extends through the one or more particular strata.

12. The computing system of claim 8, wherein the operations further comprise:

receiving a selection of one or more of the elements of the stratigraphic column, wherein the one or more of the elements represent one or more particular strata; and highlighting one or more wells, one or more zones, one or more depth intervals of the one or more wells, one or more markers of the one or more wells, or a combination thereof in a graphical geoscience interface based on the selection of the one or more of the elements, wherein the one or more wells, the one or more zones, the one or more depth intervals, or the combination thereof extend through the one or more particular strata represented by the one or more of the elements.

13. The computing system of claim 8, wherein the operations further comprise:

receiving a selection of one or more wells, one or more zones, one or more depth intervals of the one or more wells, or a combination thereof in a graphical geological interval; and highlighting one or more particular strata of the stratigraphic data in the stratigraphic navigator based on the selection, wherein the selected one or more wells, the one or more zones, the one or more depth intervals, or the combination thereof extend through the one or more particular strata.

14. The computing system of claim 8, wherein the operations further comprise:

receiving a selection of a well; and adjusting a height of at least some elements of the stratigraphic column such that the height of at least some of the elements represents a depth interval of the elements in a subterranean domain proximal to the well.

15. A non-transitory, computer-readable medium storing instructions that, when executed by at least one processor of a computing system, cause the computing system to perform operations, the operations comprising:

obtaining first geological data representing a first location;

correlating the first geological data with a chronostratigraphic timeline;

receiving a selection of a second location;

correlating second geological data representing the second location with the chronostratigraphic timeline;

determining one or more characteristics of a geology of the second location based at least in part on the first geological data representing the first location using the chronostratigraphic timeline; and visualizing a stratigraphic navigator representing the chronostratigraphic timeline and at least some of the second geological data for the second location, wherein visualizing the stratigraphic navigator comprises:

displaying the chronostratigraphic timeline as a chronostratigraphic column in the stratigraphic navigator, wherein elements of the chronostratigraphic column represent geological time intervals;

displaying a stratigraphic column in the stratigraphic navigator based on the second geological data, wherein the second geological data comprises stratigraphic data, and wherein the stratigraphic column includes elements representing one or more strata that are local to the second location; and displaying a relationship between the elements of the stratigraphic column and the elements of the chronostratigraphic column;

receiving a command to change a granularity of the stratigraphic column;

adjusting the granularity of the stratigraphic data such that more or fewer elements of the stratigraphic column are visible;

receiving a command to change an age interval of the stratigraphic data that is being displayed in the stratigraphic column; and adjusting the age interval of the stratigraphic data that is being displayed.

* * * * *